United States Patent Office 3,661,943
Patented May 9, 1972

---

3,661,943
17α-BUTATRIENYL STEROIDS
John H. Fried, Palo Alto, Calif., assignor to Syntex Corporation, Panama, Panama
No Drawing. Filed Apr. 14, 1970, Ser. No. 28,560
Int. Cl. C07c *169/08, 169/20*
U.S. Cl. 260—397.4                        6 Claims

ABSTRACT OF THE DISCLOSURE

17α-butatrienyl-estra - 1,3,5(10) - triene steroids and 17α-butatrienyl-androst-4-ene and 17α-butatrienyl-19-norandrost-4-ene steroids and methods of making these compounds. The compounds are prepared from the corresponding 17α-(2′,3′-dihalomethyleneprop-1′-en - 1′ - yl) steroid compounds by dehalogenation and rearrangement of the 17α-dihalocyclopropyl group into a propadiene group thereby affording the above butatriene compounds. The above 17α-butatrienyl-estra-1,3,5(10)-triene steroids have utility in palliating conditions arising in mammals which are caused by or related to estrogen deficiency. The 17α-butatrienyl-androst - 4 - ene and 17α-butatrienyl-19-norandrost-4-ene steroids are useful for palliating menstrual disorders and in the control and regulation of fertility in mammals.

BACKGROUND OF THE INVENTION

(1) Field of the invention

This invention relates to 17α-butatriene steroids and to methods of making such steroids. In a further aspect, this invention relates to 17α-butatatrien-estra-1,3,5(10)-triene compounds and to methods of preparing such compounds. In a still further aspect this invention relates to 17α-butatrienyl-androst - 4 - ene and 17α-butatrienyl-19-norandrost-4-ene compounds and to methods of preparing such compounds.

(2) The prior art

17α-propadien-estrane and 17α-propadien-androstane and 19-norandrostane steroids are known compounds having therapeutic utility, and are more fully described in U.S. Pats. 3,392,165 and 3,392,166. I have now discovered novel 17α-butatriene steroids which have therapeutic utility in the treatment of various conditions, in mammals, related to hormonal imbalances or abnormalities.

SUMMARY

In summary, the compounds of my invention can be represented by the following generic formula:

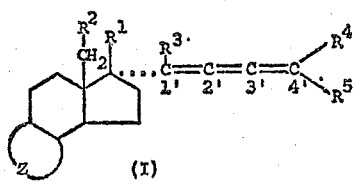

(I)

wherein $R^1$ is hydroxy, carboxylic acyloxy group having less than 12 carbon atoms, or acid labile ether group having less than 12 carbon atoms such as, for example, tetrahydrofuran-2′-yloxy, tetrahydropyran-2′-yloxy, or 4′-methoxytetrahydropyran-4′-yloxy; $R^2$ and $R^3$ are independently H or lower alkyl; $R^4$ and $R^5$ are independently H, or lower alkyl; and Z is

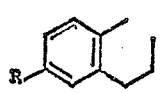 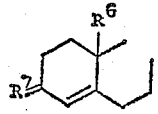

wherein R is hydroxy, carboxylic acyloxy group having less than 12 carbon atoms, lower alkoxy group having less than 12 carbon atoms such as, for example, methoxy, ethoxy or cyclopentyloxy, or acid labile ether group having less than 12 carbon atoms such as, for example, tetrahydropyran-2-yloxy, or tetrahydrofuran-2-yloxy; $R^6$ is H or methyl and $R^7$ is oxo or the group $$\overset{R^8}{\underset{|}{\phantom{C}}}\cdots H$$

wherein $R^8$ is hydrogen, lower alkyl, hydroxy, acyloxy group having less than 12 carbon atoms, lower alkoxy group having less than 12 carbon atoms such as, for example, methoxy, ethoxy or cyclopentyloxy, or acid labile ether groups having less than 12 carbon atoms such as, for example, tetrahydropyran - 2 - yloxy, tetrahydrofuran-2-yloxy and 4′-methoxytetrahydropyran-4′-yloxy.

In summary, the compounds of my invention can be prepared by the dehalogenation and rearrangement of the dihalocyclopropyl group—in the corresponding 17α-(2′,3′ - dihalomethylene-propyl - 1′en-1′yl) steroid compounds—into the corresponding propadiene group. This can be effected by any suitable treatment such as, for example, by treating the corresponding 17α-dihalocyclopropyl compound with; (1) magnesium in an inert organic reaction medium; or (2) a suitable alkylsulfinyl carbanion in an inert organic solvent; or (3) potassium t-butoxide in an inert organic solvent; or (4) a suitable alkyl lithium in an inert organic solvent; or (5) cuprous chloride in a suitable inert organic solvent.

The above compounds and processes will be further discussed hereinbelow.

DETAILED DESCRIPTION OF THE INVENTION AND PREFERRED EMBODIMENTS

The 17α-butatrienyl-estra-1,3,5(10)-triene steroid compounds of my invention can be represented by the following formula:

(II)

wherein $R^1$ is hydroxy, carboxylic acyloxy group having less than 12 carbon atoms, acid labile ether group having less than 12 carbon atoms such as, for example, tetrahydrofuran-2′-yloxy, tetrahydropyran - 2′ - yloxy, or 4′-methoxytetrahydropyran-4′-yloxy; $R^2$, $R^3$, $R^4$ and $R^5$ are independently H, or lower alkyl; and R is hydroxy, carboxylic acyloxy group having less than 12 carbon atoms, lower alkoxy group having less than 12 carbon atoms such as, for example, methoxy, ethoxy or cyclopentyloxy, or acid labile ether group having less than 12 carbon atoms such as, for example, 4′ - methoxy-tetrahydropyran-4′-yloxy, tetrahydropyran-2′-yloxy, or tetrahydrofuran-2′-yloxy.

In the preferred compounds of Formula II, R is hydroxy, methoxy or acetoxy; $R^1$ is hydroxy or acetoxy; $R^3$ is H or methyl and $R^4$ and $R^5$ are independently H or methyl. Particularly preferred compounds of Formula II, include 3-acetoxy-17β-hydroxy-17α-(4',4'-dimethyl-butatrienyl)-estra-1,3,5(10)-triene;
3,17β-diacetoxy-17α-(4',4'-dimethyl-butatrienyl)-estra-1,3,5(10)-triene;
3,17β-dihydroxy-17α-(1'-methyl-butatrienyl)-estra-1,3,5(10)-triene;
17β-acetoxy-3-hydroxy-17α-(1'-methyl-butatrienyl)-estra-1,3,5(10)-triene;
17β-acetoxy-17α-butatrienyl-3-hydroxy-estra-1,3,5(10)-triene;
17β-acetoxy-17α-butatrienyl-3-methoxy-estra-1,3,5(10)-triene;
3,17β-diacetoxy-17α-butatrienyl-estra-1,3,5(10)-triene;
17α-butatrienyl-3,17β-dihydroxy-estra-1,3,5(10)-triene;
17α-butatrienyl-17β-hydroxy-3-methoxy-estra-1,3,5(10)-triene; and
3-acetoxy-17α-butatrienyl-17β-hydroxy-estra-1,3,5(10)-triene.

The androstane or 19-norandrostane steroid compounds of my invention can be represented by the following formula:

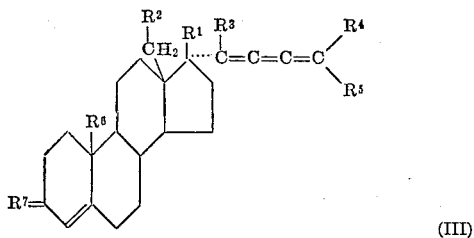

(III)

wherein $R^1$, $R^2$, $R^3$, $R^4$, $R^5$ have the same meaning as set forth hereinabove; and $R^6$ is H or methyl and $R^7$ is oxo or the group

wherein $R^8$ is hydrogen, hydroxy, acyloxy group having less than 12 carbon atoms, lower alkoxy group having less than 12 carbon atoms such as, for example, methoxy, ethoxy or cyclopentyloxy, or acid labile ether group having less than 12 carbon atoms such as, for example, tetrahydropyran-2'-yloxy, tetrahydrofuran-2'-yloxy and 4'-methoxytetrahydropyran-4'-yloxy.

The preferred compounds of Formula III are those wherein $R^1$ is hydroxy or acetoxy; $R^2$ is H or methyl; $R^3$ is H or methyl; $R^4$ and $R^5$ are independently H or methyl; $R^6$ is H or methyl; and $R^7$ is oxo or the group

wherein $R^8$ is H, hydroxy or acetoxy. Typical preferred compounds include, for example, 17α-butatrienyl-3β,17β-dihydroxy-19-norandrost-4-ene;
17α-butatrienyl-3β,17β-dihydroxy-18-methyl-19-norandrost-4-ene;
17β-acetoxy-17α-butatrienyl-3β-hydroxy-19-norandrost-4-ene;
17β-acetoxy-17α-butatrienyl-3β-hydroxy-18-methyl-19-norandrost-4-ene;
3β-acetoxy-17α-butatrienyl-17β-hydroxy-19-norandrost-4-ene;
3β-acetoxy-17α-butatrienyl-17β-hydroxy-18-methyl-19-norandrost-4-ene;
3β,17β-diacetoxy-17α-butatrienyl-19-norandrost-4-ene;
3β,17β-diacetoxy-17α-butatrienyl-18-methyl-19-norandrost-4-ene;
17α-butatrienyl-17β-hydroxy-19-norandrost-4-en-3-one;
17α-butatrienyl-17β-hydroxy-18-methyl-19-norandrost-4-en-3-one;
17β-acetoxy-17α-butatrienyl-19-norandrost-4-en-3-one;
17β-acetoxy-17α-butatrienyl-18-methyl-19-norandrost-4-en-3-one;
17α-butatrienyl-17β-hydroxy-androst-4-ene;
17α-butatrienyl-17β-hydroxy-18-methyl-androst-4-ene;
17β-acetoxy-17α-butatrienyl-androst-4-ene;
17β-acetoxy-17α-butatrienyl-18-methyl-androst-4-ene;
17β-hydroxy-17α-(4',4'-dimethyl-butatrienyl)-19-norandrost-4-en-3-one;
17β-hydroxy-17α-(4',4'-dimethyl-butatrienyl)-18-methyl-19-norandrost-4-en-3-one;
17β-acetoxy-17α-(4',4'-dimethyl-butatrienyl)-19-norandrost-4-en-3-one;
17β-acetoxy-17α-(4',4'-dimethyl-butatrienyl)-18-methyl-19-norandrost-4-en-3-one;
17β-hydroxy-17α-(1'-methyl-butatrienyl)-19-norandrost-4-en-3-one;
17β-hydroxy-17α-(1'-methyl-butatrienyl-18-methyl-19-norandrost-4-en-3-one;
17β-acetoxy-17α-(1'-methyl-butatrienyl)-19-norandrost-4-en-3-one;
17β-acetoxy-17α-(1'-methyl-butatrienyl)-18-methyl-19-norandrost-4-en-3-one;
17β-hydroxy-17α-(1',4',4'-trimethyl-butatrienyl)-19-norandrost-4-en-3-one;
17β-hydroxy-17α-(1',4',4'-trimethyl-butatrienyl)-18-methyl-19-norandrost-4-en-3-one;
17β-acetoxy-17α-(1',4',4'-trimethyl-butatrienyl)-19-norandrost-4-en-3-one; and
17β-acetoxy-17α-(1',4',4'-trimethyl-butatrienyl)-18-methyl-19-norandrost-4-en-3-one.

Of the above listed preferred compounds of Formula III, the following compounds are particularly preferred, 17α-butatrienyl-17β-hydroxy-19-norandrost-4-en-3-one;
17α-butatrienyl-17β-hydroxy-18-methyl-19-norandrost-4-en-3-one;
17β-hydroxy-17α-(1'-methyl-butatrienyl)-19-norandrost-4-en-3-one; and
17β-hydroxy-17α-(1'-methyl-butatrienyl)-18-methyl-19-norandrost-4-en-3-one.

The compounds of Formula II of my invention possess estrogenic activity and are useful in the treatment of various conditions related to estrogen deficiency such as, for example, menopause syndrome. These compounds can also be used in veterinary medicine in the same manner as known estrogenic agents and in the control and regulation of fertility. In addition, these agents demonstrate anti-androgenic activity. They can be administered in the usual pharmaceutical compositions at dosages appropriate for the condition and subject being treated.

The compounds of Formula III of my invention demonstrate progestational, anti-estrogen activity and pituitary inhibition activity and are useful in the treatment of various menstrual disorders and in the control and regulation of fertility. They can be administered in the usual pharmaceutical compositions at dosages appropriate for the condition and subject being treated.

The following terms as used hereinabove and below, have the following meanings. The term "acyloxy" refers to acyloxy groups conventionally employed in the synthetic hormone art containing from 1 to 12 carbon atoms. Typical acyloxy ester groups include, for example, acetate, propionate, butyrate, valerate, caproate, enanthate, benzoate, diphenylacetate, diethylacetate, trimethylacetate, and the like. The term "lower alkyl" refers to straight and branched saturated aliphatic groups containing from one through six carbon atoms such as, for example, methyl, ethyl, isopropyl, and the like. The term "lower alkoxy" refers to straight and branched chain alkoxy groups containing from one to twelve carbon atoms such as, for example, methoxy, ethoxy, propoxy, and the like. The term "acid labile ether" refers to acid labile ether groups having less than 12 carbon atoms such as, for example, tetrahydropyran-2'-yloxy; tetrahydrofuran - 2' - yloxy and 4'-methoxytetrahydropyran-4'-yloxy. The term "halo" refers to the halogen atoms fluoro; chloro; bromo; and iodo.

The compounds of my invention can be prepared from the corresponding 17α-(2',3'-dihalomethylene-prop-1'-en-1'-yl) steroid compounds by any suitable process which will effect the dehalogenation and rearrangement of the 2',3'-dihalomethylene-prop-1'-ene grouping into the corresponding butatriene group. I have further found that best results are obtained in terms of ease of preparation and product recovery by using the 2',3'-dichloromethylene; chlorohalomethylene; dibromomethylene or bromohalomethylene precursor as compared with the difluoromethylene, diiodomethylene or fluoroiodomethylene precursors and thus pragmatically the former precursors will typically be used. The preferred dehalogenation and rearrangement conversion can be represented (using partial steroid formulas) by the following schematic overall reaction equation:

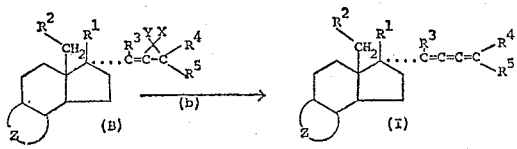

wherein $R^1$, $R^2$, $R^3$, $R^4$, $R^5$ and X have the same meanings as set forth hereinabove and Y and X are independently chloro; bromo or wherein when one of Y and X is chloro or bromo, the other can be iodo or fluoro.

I have found that suitable methods for effecting the aforementioned conversion include, for example, treating the corresponding 17α - (2',3'-dihalomethylene-prop-1'-ene) compound of Formula (B) with potassium t-butoxide in an inert organic solvent. The treatment is typically conducted at temperatures of about 20° C. or above for about from 2 to 24 hours, with best results being obtained using the reflux temperature of the system. The relative mol ratio of reactants will typically be in the range of about from 2 to 20 mols of potassium t-butoxide per mol of 17α-(2',3'-methylene-prop-1'-ene) steroid starting material though mol ratios both below and above this can be used. Suitable inert organic solvents include, for example, dimethylsulfoxide, diethylether, tetrahydrofuran and the like. The product can then be separated from the reaction mass and further purified by any suitable procedure such as, for example, chromatography over silica gel or alumina and crystallization.

The overall conversion (b) can also be effected by treating the starting material of Formula (B) with an alkali metal alkylsulfinyl carbanion in an inert organic solvent. The treatment is typically conducted using a dimethylsulfoxide solvent and temperatures in the range of about from 0 to 20° C. for about from 2 to 48 hours and for best results temperatures of about from 0 to 10° C. and treatment times of 2 to 24 hours. The relative mol ratio of reactants is not critical but typically will be in the range of about from 2 to 20 moles of alkali metal alkylsulfinyl carbanion per mol of 17α-cyclopropyl starting material and for best results mole ratios of about from 2 to 5. Suitable alkali metal alkylsulfinyl carbanions include, for example, sodium methylsulfinyl carbanion, lithium methylsulfinyl carbanion, potassium methylsulfinyl carbanion, and the like. Best results are obtained using sodium methylsulfinyl carbanion. Suitable organic solvents which can be used include, for example, dimethylsulfoxide, ether, tetrahydrofuran, dioxane, and the like. The product can be separated from the reaction mass and further purified by any suitable method such as, for example, chromography over silica gel or alumina and crystallization.

A third method of preparing the compounds of my invention includes treating the starting material of Formula (B) with activated magnesium in a suitable organic medium such as, for example, diethyl ether, tetrahydrofuran, dioxane, and the like, typically using temperatures in the range of about from 20° C. to reflux for about from 2 to 24 hours, with best results being obtained using the reflux temperatures. The compounds of my invention can also be prepared by treating the compounds of Formula (B) with an alkyl lithium such as, for example, butyl lithium, methyl lithium, t-butyl lithium and the like, in an inert organic solvent such as, for example, hexane, benzene, ether, monoglyme, diglyme, tetrahydrofuran, and compatible mixtures thereof. Particularly good results are obtained by the use of butyl lithium in an organic solvent mixture of tetrahydrofuran and hexane. The treatment is typically effected at temperatures of about from 20° C. or above for about from 3 to 24 hours with best results being obtained at temperatures in the range of about from 20 to 80° C.

The compounds of our invention can also be prepared by a fifth method by treating the corresponding compounds of Formula B with copper chloride (CuCl) in dimethyl sulfoxide, or a suitable equivalent inert organic solvent, at temperatures in the range of about from 15 to 90° C. for about from 10 to 150 hours. Typically longer treatment times are required with lower temperatures and the treatment is further preferably conducted under a nitrogen atmosphere.

Separation and purification of the products in each of the aforementioned treatments can be effected by any suitable method such as, for example, chromatography over silica gel or alumina and crystallization.

The 17α - (2',3' - dihalomethylene-prop-1'-ene) starting materials of Formula B can be prepared from the corresponding 17α-propadiene compounds by any suitable method for adding of dihalomethylene bridge across the 2',3'-double bond in the propadiene group. This process can be represented (using partial steroid formuli) by the following overall schematic reaction equation:

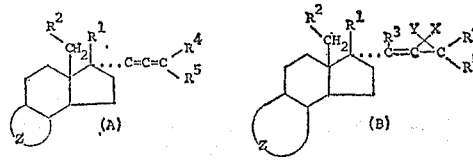

wherein $R^1$, $R^2$, $R^3$, $R^4$, $R^5$, X, Y and Z have the same meaning as set forth hereinabove.

This reaction can be conveniently effected by suitable dihalo carbene addition reactions for inserting a dihalomethylene bridge across a double bond. The dihalo carbene addition reaction can, for example, be effected by treating the propadiene compounds of Formula (A) with an alkali metal trihaloacetate in an inert organic solvent. This reaction is typically conducted at temperatures in the range of about from 80 to 160° C. for about from 1 to 5 hours, with best results being obtained by using temperatures in the range of about from 120 to 160° C. for about 2 hours. The reaction is further preferably conducted under anhydrous conditions. The relative mol ratio of reactants typically is in the range of about from 10 to 50 mols of starting material (A) per mol of dihalo carbene generated by the dihalo carbene precursor, though mole ratios both above and below this can be used. Suitable alkali metal trihaloacetate include, for example, sodium trichloroacetate, sodium chlorodifluoroacetate, sodium tribromoacetate, sodium dichlorofluoroacetate, potassium fluorodichloroacetate, potassium tribromoacetate, and the like. Suitable inert organic solvents include, for example, diglyme, monoglyme, tetrahydrofuran, and the like. The reaction product can be separated and purified by any suitable procedure such as, for example, chromatography over silica gel or alumina and crystallization.

Other suitable dihalo carbene generating reactions which can be used for preparing the starting material of Formula (B) include, for example, treatment of the corresponding 17α-propadiene compound with (1) trimethyl (trichloromethyl) tin, or trimethyl (trifluoromethyl) tin or the like, in an inert organic solvent such as, for example, benzene, tetrahydrofuran, toluene, monoglyme, and the like, in the presence of sodium iodide, typically conducted at the reflux temperature of this system; or (2) phenyl (trihalomethyl) mercury, such as for example, phenyl (trichloromethyl) mercury or phenyl (bromodichloromethyl) mercury, typically in the presence or absence of sodium iodide, in an inert organic solvent such as, for example, benzene, at the reflux temperature of the system; and (3) bromoform in the presence of potassium t-butoxide and an inert organic solvent such as, for example, tetrahydrofuran, hexane, monoglyme and the like, typically using temperatures in the range of about from −20 to 20° C. for about ½ to 10 hours, and reactant mole ratios in the range of about from 10 to 30 moles of bromoform and 10 to 30 moles of potassium t-butoxide per mole of steroid and about one mole of bromoform per mole of potassium t-butoxide, though mole ratios both above and below these ratios can also be used.

Product separation in the above reactions can be achieved by any suitable method such as, for example, those described in U.S. Pats. 3,392,165 and 3,392,166. The propadiene starting materials are known materials and can be prepared, for example, according to the methods described in the aforementioned U.S. Patents.

Variation in the 3- and/or 17-position substituents of the compounds of my invention (Formulas II and III) can be effected either prior to or subsequent to the preparation of the compounds. Further, where the desired 17-position substituent is hydroxy or where the desired 3-position substituent is hydroxy or ketone, it is preferable (especially where the alkylsulfinyl carbanion or alkyl lithium treatments, described hereinabove) are to be used to convert the 3- or 17-position hydroxy or 3-position ketone starting material to a suitable cleavable, base labile ester or acid labile ether prior to effecting the various dehalogenation and rearrangement treatments described hereinabove. The 17- and/or 3-position ester or ether product can then be easily restored to or converted to the desired 17-hydroxy and/or 3-hydroxy or 3-ketone product by cleavage of the base labile ester or acid labile ether by any suitable procedure. Generally, it is preferable to use ether protecting groups such as, for example, tetrahydropyran-2-yloxy and the like.

The 3,17β-dihydroxy steroid compounds of Formula I, or A or B can, for example, be converted to 3,17β-diacyloxy derivatives by treatment with an acid anhydride and hot pyridine or p-toluenesulfonic acid. The diester derivative can be selectively saponified, either before or after conversion to the compounds of Formula I, for example, by the use of methanolic potassium bicarbonate, to yield the corresponding 3-hydroxy-17β-acyloxy compound. The 3-ethers or 3,17β-diethers can be prepared by any suitable procedure for converting keto or hydroxy groups into ether groups. Thus, for example, treatment of 3- and/or 17β-hydroxy compounds with dihydropyran in the presence of an acid catalyst such as p-toluenesulfonic acid, p-toluenesulfonyl chloride, dinitrobenzene sulfonic acid or the like, yields the corresponding 3,17-tetrahydropyran-2-yloxy compounds. Formation of monotetrahydropyranyl ethers can be accomplished by selective protection of other hydroxy groups, for example, by ester formation, in the manner described above, followed by alkaline hydrolysis of such ester groups, after formation of the ether, if return of the esterified hydroxy group is desired. Formation of 3-methoxy derivatives can, for example, be achieved through the use of dimethylsulfate and potassium hydroxide in the conventional manner.

3-keto steroids can be reduced to the corresponding 3β-hydroxy steroid by any suitable procedure, for example, by treatment with sodium borohydride, or lithium alumina tri-(t-butoxy) hydride. The resulting 3-hydroxy group can be etherified by treatment with dihydropyran or dihydrofuran and an acid catalyst or esterified by treatment with an appropriate carboxylic acid anhydride such as acetic acid anhydride, in pyridine or the like.

The 17β-hydroxy estrenes or androstenes can be converted to the corresponding 17β-acyloxy or 17β-tetrahydropyran-2-yloxy, or 17β-tetrahydrofuran-2-yloxy derivatives by conventional methods, such as those already set forth. The 3-desoxy derivatives (i.e. $R^7$ is the group

of the 3-keto compounds of Formula III can be prepared from the corresponding 3-keto derivatives by thioketalization followed by desulfurization with Raney nickel.

The 3-keto precursors of the compounds of Formula III can be conveniently protected by 3-methoxy-3,5-diene or 3-ethyloxy-3,5-diene groups by treatment with methyl or ethyl orthoformate in a suitable inert organic solvent, e.g., dioxane, ether and benzene, in the presence of an acid catalyst, e.g. p-toluenesulfonic acid, benzenesulfonic acid, sulfosalicylic acid and the like. This treatment results in a 3-methoxy or 3-ethoxy-3,5(6)-diene steroid which is easily converted back to the 3-keto-4-ene steroid, typically after conversion of the 17α-dihalomethylene) steroid to the corresponding 17α-butatriene steroid, by treatment with a suitable acid, such as for example, hydrochloric acid, p-toluenesulfonic acid, oxalic acid and the like, in an aqueous organic solvent; such as, for example, aqueous acetone, aqueous methanol, aqueous tetrahydrofuran, and the like.

The use of protecting groups is well known to the art and further information can, for example, be obtained from the literature such as, for example, the aforementioned U.S. Pats. 3,392,165 and 3,392,166. Additional techniques for adding or changing protecting groups will thus be readily apparent to those skilled in the art.

A further understanding of my invention can be had from the following nonlimiting examples; wherein mmoles refers to gram millimoles, me. refers to gram milliequivalents, and temperatures are given in ° C.

EXAMPLE 1

This example illustrates methods of preparing 17α(2′,3′-dihalomethylene-prop-1′-en-1′-yl) - steroid starting materials for the compounds of my invention. In this example a sodium trichloroacetate solution is prepared by dissolving 20 mmoles of sodium trichloroacetate in 30 ml. of diglyme (distilled over potassium hydroxide pellets) and then vacuum distilling off 10 ml. of diglyme (using temperatures in the range of from 30 to 40° C.). A 17α-(propadien-1′-yl) steroid solution is prepared by dissolving 1 mmole of 17β-acetoxy-17α-(propadien-1′-yl)-19-norandrost-4-en-3-one in 17 ml. of diglyme. The 17β-acetoxy-17α-(propadien-1′-yl) - 19 - norandrost - 4 - en-3-one solution is heated to its boiling point and maintained at this temperature throughout the addition of the sodium trichloroacetate solution. The sodium trichloroacetate solution is slowly added dropwise to the steroid over a period of one hour, during this addition 40 ml. of diglyme is distilled from the reaction mixture (atmospheric pressure). The reaction mixture is then refluxed for 10 minutes, cooled, filtered and evaporated. The evaporation residue is subjected to preparative thick-layer chromatography, eluting with hexane-ethyl acetate (4:1 by vol.) affords crude 17β-acetoxy-17α-(2′,3′ - dichloromethylene-prop-1′-en-1-yl)-19-norandrost-4-en-3-one which is then further purified by crystallization from acetone-ether.

By following the above procedure using the corresponding 17α-propadiene steroid starting materials, the following compounds are prepared:

17β-acetoxy-17α-(2′,3′-dichloromethylene-1′-methyl-prop-1′-en-1′-yl)-19-norandrost-4-en-3-one;
17β-acetoxy-17α-(2′,3′-dichloromethylene-3′-methyl-prop-1′-en-1′-yl)-19-norandrost-4-en-3-one;

17β-acetoxy-17α-(2',3'-dichloromethylene-3',3'-dimethyl-prop-1'-en-1'-yl)-19-norandrost-4-en-3-one;
17β-acetoxy-17α-(2',3'-dichloromethylene-1',3'-dimethyl-prop-1'-en-1'-yl)-19-norandrost-4-en-3-one;
17β-acetoxy-17α-(2',3'-dichloromethylene-1',3',3'-trimethyl-prop-1'-en-1'-yl)-19-norandrost-4-en-3-one;
17β-acetoxy-17α-(2',3'-dichloromethylene-prop-1'-en-1'-yl)-18-methyl-19-norandrost-4-en-3-one;
17β-acetoxy-17α-(2',3'-dichloromethylene-1'-methyl-prop-1'-en-1'-yl)-18-methyl-19-norandrost-4-en-3-one;
17β-acetoxy-17α-(2',3'-dichloromethylene-3'-methyl-prop-1'-en-1'-yl)-18-methyl-19-norandrost-4-en-3-one;
17β-acetoxy-17α-(2',3'-dichloromethylene-3',3'-dimethyl-prop-1'-en-1'-yl)-18-methyl-19-norandrost-4-en-3-one;
17β-acetoxy-17α-(2',3'-dichloromethylene-1',3'-dimethyl-prop-1'-en-1'-yl)-18-methyl-19-norandrost-4-en-3-one;
17β-acetoxy-17α-(2',3'-dichloromethylene-1',3,'3'-trimethyl-prop-1'-en-1'-yl)-18-methyl-19-norandrost-4-en-3-one;
17β-acetoxy-17α-(2',3'-dichloromethylene-prop-1'-en-1'-yl)-androst-4-en-3-one;
17β-acetoxy17α-(2',3'-dichloromethylene-1'-methyl-prop-1'-en-1'-yl)-androst-4-en-3-one;
17β-acetoxy-17α-(2',3'-dichloromethylene-3'-methyl-prop-1'-en-1'-yl)-androst-4-en-3-one;
17β-acetoxy-17α-(2',3'-dichloromethylene-3',3'-dimethyl-prop-1'-en-1'-yl)-androst-4-en-3-one;
17β-acetoxy-17α-(2',3'-dichloromethylene-1',3'-dimethyl-prop-1'-en-1'-yl)-androst-4-en-3-one;
17β-acetoxy-17α-(2',3'-dichloromethylene-1',3,3'-trimethyl-prop-1'-en-1'-yl)-androst-4-en-3one;
17β-acetoxy-17α-(2',3'-dichloromethylene-1'-methyl-prop-1'-en-1'-yl)-18-methyl-androst-4-en-3-one;
17β-acetoxy-17α-(2',3'-dichloromethylene-3'-methyl-prop-1'-en-1'-yl)-18-methyl-androst-4-en-3-one;
17β-acetoxy-17α-(2',3'-dichloromethylene-3',3'-dimethyl-prop-1'-en-1'-yl)-18-methyl-androst-4-en-3-one;
17β-acetoxy-17α-(2',3'-dichloromethylene-1',3'-dimethyl-prop-1'-en-1'-yl)-18-methyl-androst-4-en-3-one;
17β-acetoxy-17α-(2',3'-dichloromethylene-1',3',3'-trimethyl-prop-1'-en-1'-yl)-18-methyl-androst-4-en-3-one;
3,17β-diacetoxy-17α-(2',3'-dichloromethylene-prop-1'-en-1'-yl)-estra-1,3,5(10)-triene;
3,17β-diacetoxy-17α-(2',3'-dichloromethylene-1'-methyl-prop-1'-en-1'-yl)-estra-1,3,5(10)-triene;
3,17β-diacetoxy-17α-(2',3'-dichloromethylene-3'-methyl-prop-1'-en-1'-yl)-estra-1,3,5(10)-triene;
3,17β-diacetoxy-17α-(2',3'-dichloromethylene-3',3'-dimethyl-prop-1'-en-1'-yl)-estra-1,3,5,(10)-triene;
3,17β-diacetoxy-17α-(2',3'-dichloromethylene-1',3',3'-trimethyl-prop-1'-en-1'-yl)-estra-1,3,5(10)-triene;
3,17β-diacetoxy-17α-(2',3'-dichloromethylene-prop-1'-en-1'-yl)-18-methyl-estra-1,3,5(10)-triene;
3,17β-diacetoxy-17α-(2',3'-dichloromethylene-1'-methyl-prop-1'-en-1'-yl)-18-methyl-estra-1,3,5(10)-triene;
3,17β-diacetoxy-17α-(2',3'-dichloromethylene-3'-methyl-prop-1'-en-1'-yl)-18-methyl-estra-1,3,5(10)-triene;
3,17β-diacetoxy-17α-(2',3'-dichloromethylene-3',3'-dimethyl-prop-1'-en-1'-yl)-18-methyl-estra-1,3,5(10)-triene;
3,17β-diacetoxy-17α-(2',3'-dichloromethylene-1',3',3'-trimethyl-prop-1'-en-1'-yl)-18-methyl-estra-1,3,5(10)-triene.

By following the same procedure as above but in place of 20 mmoles sodium trichloroacetate using 10 mmoles of sodium difluorochloroacetate, the corresponding 17α-(2',3'-difluoromethylene) forms of the above compounds are respectively prepared. Similarly by using 10 mmoles of sodium dichlorofluoroacetate, in place of 20 mmoles of sodium trichloroacetate, the corresponding 17α-(2',3'-chlorofluoromethylene) forms of the above compounds are respectively prepared.

EXAMPLE 2

This example illustrates further methods for preparing 17α - (2',3' - dihalomethylene - prop - 1' - en - 1' - yl) steroid starting materials for the compounds of my invention. In this example 10 me. of 17β - (tetrahydropyran - 2' - yloxy) - 17α - (propadien - 1' - yl) - 19-norandrost - 4 - en - 3 - one and 15 me. of phenyl (trichloromethyl) mercury are dissolved in 100 ml. of benzene. The solution is heated at reflux for 18 hours, then cooled and filtered. The recovered solids are washed with water and then evaporated to dryness affording 17α-(2',3' - dichloromethylene - prop - 1' - en - 1' - yl) - 17β-(tetrahydropyran - 2' - yloxy) - 19 - norandrost - 4 - en-3-one residue which is further purified by chromatography over alumina and crystallization from ether:acetone.

By following the same procedure using the corresponding 17α-propadiene steroid starting materials, the following compounds are prepared:

17α-(2',3'-dichloromethylene-1'-methyl-prop-1'-en-1'-yl)-17β-(tetrahydropyran-2'-yloxy)-19-norandrost-4-en-3-one;
17α-(2',3'-dichloromethylene-3'-methyl-prop-1'-en-1'-yl)-17β-(tetrahydropyran-2'-yloxy)-19-norandrost-4-en-3-one;
17α-(2',3'-dichloromethylene-3',3'-dimethyl-prop-1'-en-1'-yl)-17β-(tetrahydropyran-2'-yloxy)-19-norandrost-4-en-3-one;
17α-(2',3'-dichloromethylene-1',3'-dimethyl-prop-1'-en-1'-yl)-17β-(tetrahydropyran-2'-yloxy)-19-norandrost-4-en-3-one;
17α-(2',3'-dichloromethylene-1',3',3'-trimethyl-prop-1'-en-1'-yl)-17β-(tetrahydropyran-2'-yloxy)-19-norandrost-4-en-3-one;
17α-(2',3'-dichloromethylene-prop-1'-en-1'-yl)-17β-(tetrahydropyran-2'-yloxy)-18-methyl-19-norandrost-4-en-3-one;
17α-(2',3'-dichloromethylene-1'-methyl-prop-1'-en-1'-yl)-17β-(tetrahydropyran-2'-yloxy)-18-methyl-19-norandrost-4-en-3-one;
17α-(2',3'-dichloromethylene-3'-methyl-prop-1'-en-1'-yl)-17β-(tetrahydropyran-2'-yloxy)-18-methyl-19-norandrost-4-en-3-one;
17α-(2',3'-dichloromethylene-3',3'-dimethyl-prop-1'-en-1'-yl)-17β-(tetrahydropyran-2'-yloxy)-18-methyl-19-norandrost-4-en-3-one;
17α-(2',3'-dichloromethylene-1',3'-dimethyl-prop-1'-en-1'-yl)-17β-(tetrahydropyran-2'-yloxy)-18-methyl-19-norandrost-4-en-3-one;
17α-(2',3'-dichloromethylene-1',3',3'-trimethyl-prop-1'-en-1'-yl)-17β-(tetrahydropyran-2'-yloxy)-18-methyl-19-norandrost-4-en-3-one;

Similarily the corresponding androst forms of the above listed 19-norandrost compounds are prepared from the corresponding androst precursors. The below listed compounds are also similarily prepared from the corresponding 17α-propadien-estra-1,3,5(10)-triene precursors:

3-acetoxy-17α-(2',3'-dichloromethylene-prop-1'-en-1'-yl)-17β-(tetrahydropyran-2'-yloxy)-estra-1,3,5(10)-triene;
3-acetoxy-17α-(2',3'-dichloromethylene-1'-methyl-prop-1'-en-1'-yl)-17β-(tetrahydropyran-2'-yloxy)-estra-1,3,5(10)-triene;
3-acetoxy-17α-(2',3'-dichloromethylene-3'-methyl-prop-1'-en-1'-yl)-17β-(tetrahydropyran-2'-yloxy)-estra-1,3,5,(10)-triene;
3-acetoxy-17α-(2',3'-dichloromethylene-3',3'-dimethyl-prop-1'-en-1'-yl)-17β-(tetrahydropyran-2'-yloxy)-estra-1,3,5(10)-triene;

3-acetoxy-17α-(2',3'-dichloromethylene-1',3'-dimethyl-prop-1'-en-1'-yl)-17β-(tetrahydropyran-2'-yloxy)-estra-1,3,5(10)-triene;

3-acetoxy-17α-(2',3'-dichloromethylene-1',3',3'-trimethyl-prop-1'-en-1'-yl)-17β-(tetrahydropyran-2'-yloxy)-estra-1,3,5(10)-triene;

3-acetoxy-17α-(2',3'-dichloromethylene-prop-1'-en-1'-yl)-17β-(tetrahydropyran-2'-yloxy)-18-methyl-estra-1,3,5(10)-triene;

3-acetoxy-17α-(2',3'-dichloromethylene-1'-methyl-prop-1'-en-1'-yl)-17β-(tetrahydropyran-2'-yloxy)-18-methyl-estra-1,3,5(10)-triene;

3-acetoxy-17α-(2',3'-dichloromethylene-3'-methyl-prop-1'-en-1'-yl)-17β-(tetrahydropyran-2'-yloxy)-18-methyl-estra-1,3,5(10)-triene;

3-acetoxy-17α-(2',3'-dichloromethylene-3',3'-dimethyl-prop-1'-en-1'-yl)-17β-(tetrahydropyran-2'-yloxy)-18-methyl-estra-1,3,5(10)-triene;

3-acetoxy-17α-(2',3'-dichloromethylene-1',3'-dimethyl-prop-1'-en-1'yl)-17β-(tetrahydropyran-2'-yloxy)-18-methyl-estra-1,3,5(10)-triene;

3-acetoxy-17α-(2',3'-dichloromethylene-1',3',3'-trimethyl-propy-1'-en-1'-yl)-17β-(tetrahydropyran-2'-yloxy)-18-methyl-estra-1,3,5(10)-triene.

By following the same procedure but using phenyl (dibromochloromethyl) mercury; phenyl (tribromomethyl) mercury and phenyl (dibromofluoromethyl) mercury, respectively, the corresponding 17α - (2',3'-bromochloromethylene), 17α-(2',3'-dibromomethylene) and 17α-(2',3'-bromofluoromethylene) forms of the above compounds are, respectively, prepared.

EXAMPLE 3

This example illustrates further methods for preparing 17α-dihalomethylene steroid starting materials. In this example 20 mc. of bromoform and 20 mc. of potassium t-butoxide are added to a solution of 2 mc. of 17β-(tetrahydropyran - 2' - yloxy) - 3-methoxy-17α-propadien-1'-yl)-estra-1,3,5(10)-triene in 100 ml. of cyclohexane at 0° C., with stirring. The mixture is maintained at 0° C. for 6 hours then poured into water and extracted with ethyl acetate. The ethyl acetate extracts are evaporated affording a crude 17α-(2',3'-dibromomethylene-prop-1'-en-1'-yl)-17β-(tetrahydropyran - 2' - yloxy)-3-methoxy-estra-1,3,5(10)-triene residue which is then purified by chromatography over alumina eluting first with hexane-benzene mixture, and then with pure benzene.

By following the above procedure using the corresponding 17α-propadiene steroid starting materials, the following compounds are prepared:

17α-(2',3'-dibromomethylene-1'-methyl-prop-1'-en-1'yl)-17β-(tetrahydropyran-2'-yloxy)-3-methoxy-estra-1,3,5(10)-triene;

17α-(2',3'-dibromomethylene-3'-methyl-prop-1'-en-1'-yl)-17β-(tetrahydropyran-2'-yloxy)-3-methoxy-estra-1,3,5(10)-triene;

17α-(2',3'-dibromomethylene-1',3'-dimethyl-prop-1'-en-1'-yl)-17β-(tetrahydropyran-2'-yloxy)-3-methoxy-estra-1,3,5(10)-triene;

17α(2',3'-dibromomethylene-3',3'-dimethyl-prop-1'-en-1'-yl)-17β-(tetrahydropyran-2'-yloxy)-3-methoxy-estra-1,3,5(10)-triene;

17α-(2',3'-dibromomethylene-1',3',3'-trimethyl-prop-1'-en-1'-yl)-17β-(tetrahydropyran-2'-yloxy)-3-methoxy-estra-1,3,5(10)-triene;

17α-(2',3'-dibromomethylene-1'-methyl-prop-1'-en-1'-yl)-17β-(tetrahydropyran-2'-yloxy)-3-methoxy-18-methyl-estra-1,3,5(10)-triene;

17α-(2',3'-dibromomethylene-3'-methyl-prop-1'-en-1' yl)-17β-(tetrahydropyran-2'-yloxy)-3-methoxy-18-methyl-estra-1,3,5(10)-triene;

17α-(2',3'-dibromomethylene-1',3'-dimethyl-prop-1'-en-1'-yl)-17β-(tetrahydropyran-2'-yloxy)-3-methoxy-18-methyl-estra-1,3,5(10)-triene;

17α-(2',3'-dibromomethylene-3',3'-dimethyl-prop-1'-en-1'-yl)-17β-(tetrahydropyran-2'-yloxy)-3-methoxy-18-methyl-estra-1,3,5(10)-triene;

17α(2',3'-dibromomethylene-1',3',3'-trimethyl-prop-1'-en-1'-yl)-17β-(tetrahydropyran-2'-yloxy)-3-methoxy-18-methyl-estra-1,3,5(10)-triene;

17α-(2',3'-dibromomethylene-1'-methyl-prop-1'-en-1'-yl)-17β-(tetrahydropyran-2'-yloxy)-3-ethoxy-18-methyl-estra-1,3,5(10)-triene;

17α-(2',3'-dibromomethylene-3'-methyl-prop-1'-en-1'yl)-17β-(tetrahydropyran-2'-yloxy)-3-ethoxy-18-methyl-estra-1,3,5(10)-triene;

17α-(2',3'-dibromomethylene-1',3'-dimethyl-prop-1'-en-1'-yl)17β-(tetrahydropyran-2'-yloxy)-3-ethoxy-18-methyl-estra-1,3,5(10)-triene;

17α-(2',3'-dibromomethylene-3',3'-dimethyl-prop-1'-en-1'-yl)-17β-(tetrahydropyran-2'-yloxy)-3-ethoxy-18-methyl-estra-1,3,5(10)-triene;

17α-(2',3'-dibromomethylene-1',3',3'-trimethyl-prop-1'-en-1'-yl)-17β-(tetrahydropyran-2'-yloxy)-3-ethoxy-18-methyl-estra-1,3,5(10)-triene.

EXAMPLE 4

This example illustrates methods of preparing 3-deoxy-17α-dihalomethylene-prop-1'-en-1'-yl steroids which can be used as starting materials for preparing the 3-deoxy compounds of my invention. In this example a solution of 5 g. of 17β-acetoxy-17α-(2',3'-dichloromethylene-prop-1' - en - 1'-yl)-19-norandrost-4-en-3-one in 100 ml. of glacial acetic acid, containing 5 ml. of 1,2-ethanedithiol and 4 ml. of a saturated solution of hydrogen chloride in acetic acid, is allowed to stand at room temperature for 4 hours. Water is added and the resulting mixture then extracted with ethyl acetate. The extracts are washed with a 5% aqueous sodium bicarbonate solution and water, dried over sodium sulfate and evaporated to dryness. The residue is recrystallized from ether:hexane and 4 g. of this material in 500 ml. of ethanol (previously distilled over Raney nickel) is heated at reflux with 50 g. of Raney nickel for 6 hours. The catalyst is removed by filtration and washed with hot ethanol. The combined washings and filtrate are evaporated to dryness. The residue is dissolved in chloroform and resulting solution is first washed with a dilute aqueous solution of hydrochloric acid, then dilute aqueous carbonate solution and then with water. The washed solution is dried and evaporated to dryness affording a 17β - acetoxy-17α-(2',3'-dichloromethylene-prop-1'-en-1'-yl)-19-norandrost-4-ene residue which is further purified by recrystallization from acetone:hexane.

By following the above procedure using the corresponding 3-keto-17α-dihalomethylene-prop-1'-en-1'-yl steroid as starting materials, the following 3-deoxy compounds are prepared:

17β-acetoxy-17α-(2',3'-dichloromethylene-1'-methyl-prop-1'-en-1'-yl)-19-norandrost-4-ene;

17β-acetoxy-17α-(2',3'-dichloromethylene-3'-methyl-prop-1'-en-1'-yl)-19-norandrost-4-ene;

17β-acetoxy-17α-(2',3'-dichloromethylene-3',3'-dimethyl-prop-1'-en-1'-yl)-19-norandrost-4-ene;

17β-acetoxy-17α-(2',3'-dichloromethylene-1',3'-dimethyl-prop-1'-en-1'-yl)-19-norandrost-4-ene;

17β-acetoxy-17α-(2',3'-dichloromethylene-1',3',3'-trimethyl-prop-1'-en-1'-yl)-19-norandrost-4-ene;

17β-acetoxy-17α-(2',3'-dichloromethylene-prop-1'-en-1'-yl)-18-methyl-19-norandrost-4-ene;

17β-acetoxy-17α-(2',3'-dichloromethylene-1'-methyl-prop-1'-en-1'-yl)-18-methyl-19-norandrost-4-ene;

17β-acetoxy-17α-(2',3'-dichloromethylene-3'-methyl-prop-1'-en-1'-yl)-18-methyl-19-norandrost-4-ene;

17β-acetoxy-17α-(2',3'-dichloromethylene-3',3'-dimethyl-prop-1'-en-1'-yl)-18-methyl-19-norandrost-4-ene;

17β-acetoxy-17α-(2',3'-dichloromethylene-1',3'-dimethyl-prop-1'-en-1'-yl)-18-methyl-19-norandrost-4-ene;

17β-acetoxy-17α-(2',3'-dichloromethylene-1',3',3'-tri-
  methyl-prop-1'-en-1'-yl)-18-methyl-19-norandrost-
  4-ene;
17β-acetoxy-17α-(2',3'-dichloromethylene-prop-1'-en-
  1'-yl)-androst-4-ene;
17β-acetoxy-17α-(2',3'-dichloromethylene-1'-methyl-
  prop-1'-en-1'-yl)-androst-4-ene;
17β-acetoxy-17α-(2',3'-dichloromethylene-3'-methyl-
  prop-1'-en-1'-yl)-androst-4-ene;
17β-acetoxy-17α-(2',3'-dichloromethylene-3',3'-dimethyl-
  prop-1'-en-1'-yl)-androst-4-ene;
17β-acetoxy-17α-(2',3'-dichloromethylene-1',3'-dimethyl-
  prop-1'-en-1'-yl)-androst-4-ene;
17β-acetoxy-17α-(2',3'-dichloromethylene-1',3',3'-tri-
  methyl-prop-1'-en-1'-yl)-androst-4-ene;
17β-acetoxy-17α-(2',3'-dichloromethylene-1'-methyl-
  prop-1'-en-1'-yl)-androst-4-ene;
17β-acetoxy-17α-(2',3'-dichloromethylene-3'-methyl-
  prop-1'-en-1'-yl)-androst-4-ene;
17β-acetoxy-17α-(2',3'-dichloromethylene-3',3'-dimethyl-
  prop-1'-en-1'-yl)-androst-4-ene;
17β-acetoxy-17α-(2',3'-dichloromethylene-1',3'-dimethyl-
  prop-1'-en-1'-yl)-androst-4-ene;
17β-acetoxy-17α-(2',3'-dichloromethylene-1',3',3'-tri-
  methyl-prop-1'-en-1'-yl)-androst-4-ene.

By using the corresponding 17β-hydroxy and 17β-(tetra-hydropyran - 2' - yloxy) starting materials in place of the 17β-acetoxy starting materials used above, the corresponding 17β-hydroxy and 17β-(tetrahydropyran-2'-yl-oxy) forms of the above 3-desoxy compounds, are respectively, prepared. The corresponding 17α-(dibromomethylene-prop-1'-en-1'-yl);
17α-(difluoromethylene-prop-1'-en-1'-yl);
17α-(bromochloromethylene-prop-1'-en-1'-yl);
17α-(bromofluoromethylene-prop-1'-en-1'-yl); and
17α-(chlorofluoromethylene-prop-1'-en-1'yl)

forms of the above 3-desoxy are also respectively prepared, according to the above procedure, for each of the 17β-acetoxy, 17β-hydroxy; and 17β-(tetrahydropyran-2'-yloxy) series, from the corresponding 17α-(dihalomethylene-prop-1'-en-1'-yl) starting materials.

EXAMPLE 5

This example illustrates a method of preparing 17α-dihalomethylene-prop-1'-en-1'-yl-steroid - 3,17β - ethers and 17β-hydroxy-3-ones. In this example 1.2 ml. of freshly distilled ethyl orthoformate and 0.8 gram of p-toluenesulfonic acid is added to a suspension of 1 gram of 17α-(2',3'-dichloromethylene-prop - 1' - en-1'-yl)-17β-(tetrahydropyran-2'-yloxy)-19-norandrost-4-en-3-one in 7.5 ml. of peroxide-free dioxane. The mixture is stirred at room temperature for 15 minutes and allowed to stand at room temperature for an additional 30 minutes, and then 0.8 ml. of pyridine is added. Water is then added to the mixture until precipitation occurs. The resulting precipitate is collected by filtration, washed with water and then air-dried affording a 17α-(2',3'-dichloromethylene-prop-1'-en-1'-yl)-3-ethoxy - 17β - (tetrahydropyran-2'-yloxy)-19-norandrosta-3,5-diene residue which is further purified by recrystallization using an acetone:hexane solvent. By following the same procedure, the 3-keto-17β-(tetrahydropyran-2'-yloxy) products of Example 2 are converted, respectively, to the corresponding 17α-(2',3'-dihalomethylene-prop -1' - en-1'-yl)-3-ethoxy-17β-(tetrahydropyran-2'-yloxy)-3,5-diene steroids.

The 17α-(2',3'-dichloromethylene-prop - 1' - en-1'-yl)-3-ethoxy-17β-(tetrahydropyran - 2'-yloxy)-19-norandrost-3,5-diene product is divided into two equal portions. One portion is reserved for use in Example 14, and the other portion is dissolved in 10 ml. of acetone. A few drops of aqueous 36% (wt.) hydrochloric acid is then added to the acetone solution. The resulting mixture is then heated for a few minutes at 100° C. and then cooled and diluted with water. The mixture is then filtered and the resultant filter cake dried and further purified by recrystallization from acetone:hexane solvent affording 17α-(2',3'-dichloromethylene - prop - 1'-en-1'-yl)-17β-hydroxy-19 - norandrost-4-en-3-one. The other 17β-(2',3'-dihalomethylene-prop - 1' - en-1'-yl)-3-ethoxy-17β-(tetrahydropyran-2'-yloxy)-3,5-diene steroid products produced above are similarly divided into two portions; one portion is reserved for use in Example 14, and the other portion is converted to the corresponding 17α-(2',3'-dihalomethylene-prop - 1' - en-1'-yl)-17β-hydroxy-4-en-3-one steroids, according to the same procedure.

EXAMPLE 6

This example illustrates methods of cleaving 17β-ester protecting groups to produce 17β-hydroxy compounds. In this example, a solution of 1 g. of 17β-acetoxy-17α-(2',3'-dichloroethylene-prop-1'-en-1'yl) - 3β - tetrahydropyran-2'-yloxy)-19-norandrost-4-ene in 50 ml. of methanol is allowed to stand at room temperature for 13 hours with an aqueous 1% (wt.) solution of potassium carbonate in 1 ml. of water. The reaction mixture is then poured into ice water and the solid which forms is collected by filtration, washed with water to neutrality and dried, yielding a 17α-(2',3-dichloromethylene-prop-1'-en-1'-yl) - 17β - hydroxy - 3β - (tetrahydropyran-2'-yloxy)-19-norandrost-4-ene residue which is further purified by recrystallization from methylene chloride:ether.

By following the same procedure, the following 17β-hydroxy compounds are prepared from the corresponding 17β-acetoxy compounds:

17α-(2',3'-dichloromethylene - 1' - methyl-prop-1'-en-1'-
  yl)-17β-hydroxy-3β-(tetrahydropyran-2'-yloxy)-19-
  norandrost-4-ene;
17α - (2',3' - dichloromethylene-3'-methyl-prop-1'-en-1'-
  yl)-17β-hydroxy-3β-(tetrahydropyran-2'-yloxy)-19-
  norandrost-4-ene;
17α-(2',3'-bromochloromethylene - 1',3' - dimethyl-prop-
  1'-en-1'-yl)-17β-hydroxy-3β-(tetrahydropyran-2'-
  yloxy)-19-norandrost-4-ene;
17α-(2',3'-difluoromethylene - 3',3' - dimethyl-prop-1-en-
  1'-yl)-17β-hydroxy-3β-(tetrahydropyan-2'-yloxy)-
  19-norandrost-4-ene;
17α - (2',3'-bromofluoromethylene-1',3',3'-trimethyl-prop-
  1'-en-1'-yl)-17β-hydroxy-3β-(tetrahydropyran-2'-
  yloxy)-19-norandrost-4-ene;
17α-(2',3' - dibromomethylene - 1' - methyl-1'-en-1'-yl)-
  17β-hydroxy-18-methyl-3β-(tetrahydropyran-2'-
  yloxy)-19-norandrost-4-ene;
17α-(2',3'-bromofluoromethylene - 1',3',3' - trimethyl-1'-
  en-1'-yl)-17β-hydroxy-18-methyl-3β-(tetrahydro-
  pyran-2'-yloxy)-19-norandrost-4-ene;
17α-(2',3'-dibromomethylene-prop - 1' - en - 1' - yl)-17β-
  hydroxy-3-(tetrahydropyran-2'-yloxy)-estra-1,3,
  5(10)-triene;
17α - (2',3' - difluoromethylene - 1' - methyl-prop-1'-en-1'-
  yl)-17β-hydroxy-3-(tetrahydropyran-2'-yloxy)-
  estra-1,3,5(10)-triene;
17α-(2',3' - dibromomethylene - 3' - methyl-prop-1'-en-1'-
  yl)-17β-hydroxy-3-(tetrahydropyran-2'-yloxy)-
  estra-1,3,5(10)-triene;
17α-(2',3'-chloro - 1',3' - dimethyl-prop-1'-en-1'-yl)-17β-
  hydroxy-3-(tetrahydropyran-2'-yloxy)-estra-1,3,
  5(10)-triene;
17α-(2',3'-bromochloro - 3',3' - dimethyl-prop-1'-en-1'-
  yl)-17β-hydroxy-3-(tetrahydropyran-2'-yloxy)-estra-
  1,3,5(10)-triene;
17α-(2',3'-chlorofluoro - 1',3',3' - trimethyl-prop-1'-en-1'-
  yl)-17β-hydroxy-3-(tetrahydropyran-2'-yloxy)-estra-
  1,3,5(10)-triene;
17α - (2',3' - dibromomethylene - prop-1'-en-1'-yl)-17β-
  hydroxy-18-methyl-3-(tetrahydropyran-2'-yloxy)-
  estra-1,3,5(10)-triene;

17α-(2',3'-difluoromethylene-1'-methyl-prop-1'-en-1'-yl)-17β-hydroxy-18-methyl-3-(tetrahydropyran-2'-yloxy)-estra-1,3,5(10)-triene;
17α-(2',3'-dibromomethylene-3'-methyl-prop-1'-en-1'-yl)-17β-hydroxy-18-methyl-3-(tetrahydropyran-2'-yloxy)-estra-1,3,5(10)-triene;
17α-(2',3'-dichloro-1',3'-dimethyl-propyl-1'-en-1'-yl)-17β-hydroxy-18-methyl-3-(tetrahydropyran-2'-yloxy)-estra-1,3,5(10)-triene;
17α-(2',3'-bromochloro-3',3'-dimethyl-prop-1'-en-1'-yl)-17β-hydroxy-18-methyl-3-(tetrahydropyran-2'-yloxy)-estra-1,3,5(10)-triene;
17α-(2',3'-chlorofluoro-1',3',3'-trimethyl-prop-1'-en-1'-yl)-17β-hydroxy-18-methyl-3-(tetrahydropyran-2'-yloxy)-estra-1,3,5(10)-triene;
17α-butatrienyl-17β-hydroxy-3β-(tetrahydropyran-2'-yloxy)-19-norandrost-4-ene;
17β-hydroxy-17α-(1'-methyl-butatrien-1'-yl)-3β-(tetrahydropyran-2'-yloxy)-19-norandrost-4-ene;
17β-hydroxy-17α-(4'-methyl-butatrien-1'-yl)-3β-(tetrahydropyran-2'-yloxy)-19-norandrost-4-ene;
17β-hydroxy-17α-(1',4'-dimethyl-butatrien-1'-yl)-3β-(tetrahydropyran-2'-yloxy)-19-norandrost-4-ene;
17β-hydroxy-17α-(4',4'-dimethyl-butatrien-1'-yl)-3β-(tetrahydropyran-2'-yloxy)-19-norandrost-4-ene;
17β-hydroxy-17α-(1',4',4'-trimethyl-butatrien-1'-yl)-3β-(tetrahydropyran-2'-yloxy)-19-norandrost-4-ene;
17β-hydroxy-18-methyl-17α-(1'-methyl-butatrien-1'-yl)-3β-(tetrahydropyran)-19-norandrost-4-ene;
17β-hydroxy-18-methyl-17α-(1',4',4'-trimethyl-butatrien-1'-yl)-3β-(tetrahydropyran-2'-yloxy)-19-norandrost-4-ene;
17α-butatrienyl-17β-hydroxy-3-(tetrahydropyran-2'-yloxy)-estra-1,3,5(10)-triene;
17β-hydroxy-17α-(1'-methyl-butatrien-1'-yl)-3-(tetrahydropyran-2-yloxy)-estra-1,3,5(10)-triene;
17β-hydroxy-17α-(4'-methyl-butatrien-1'-yl)-3-(tetrahydropyran-2'-yloxy)-estra-1,3,5(10)-triene;
17β-hydroxy-17α-(1',4'-dimethyl-butatrien-1'-yl)-3-(tetrahydropyran-2'-yloxy)-estra-1,3,5(10)-triene;
17β-hydroxy-17α-(4',4'-dimethyl-butatrien-1'-yl)-3-(tetrahydropyran-2'-yloxy)-estra-1,3,5(10)-triene;
17β-hydroxy-17α-(1',4',4'-trimethyl-butatrien-1'-yl)-3-(tetrahydropyran-2'-yloxy)-estra-1,3,5(10)-triene;
17α-butatrienyl-17β-hydroxy-18-methyl-3-(tetrahydropyran-2'-yloxy)-estra-1,3,5(10)-triene;
17β-hydroxy-18-methyl-17α-(1'-methyl-butatrien-1'-yl)-3-(tetrahydropyran-2'-yloxy)-estra-1,3,5(10)-triene;
17β-hydroxy-18-methyl-17α-(4'-methyl-butatrien-1'-yl)-3-(tetrahydropyran-2'-yloxy)-estra-1,3,5(10)-triene;
17β-hydroxy-18-methyl-17α-(1',4'-dimethyl-butatrien-1'-yl)-3-(tetrahydropyran-2'-yloxy)-estra-1,3,5(10)-triene;
17β-hydroxy-18-methyl-17α-(4',4'-dimethyl-butatrien-1'-yl)-3-(tetrahydropyran-2'-yloxy)-estra-1,3,5(10)-triene;
17β-hydroxy-18-methyl-17α-(1',4',4'-trimethyl-butatrien-1'-yl)-3-(tetrahydropyran-2'-yloxy)-estra-1,3,5(10)-triene.

Similarly, the corresponding androst compound for each of the above enumerated 19-norandrost compounds is prepared from the corresponding androst precursor.

By following the above procedure, the following 3-desoxy-17β-hydroxy compounds are prepared from the corresponding 17-acetoxy-3-desoxy compounds:

17α-(2',3'-dichloromethylene-prop-1'-en-1'-yl)-17β-hydroxy-19-norandrost-4-ene;
17α-(2',3'-dichloromethylene-1'-methyl-prop-1'-en-1'-yl)-17β-hydroxy-19-norandrost-4-ene;
17α-(2',3'-dichloromethylene-3'-methyl-prop-1'-en-1'-yl)-17β-hydroxy-19-norandrost-4-ene;
17α-(2',3'-dichloromethylene-3',3'-dimethyl-prop-1'-en-1'-yl)-17β-hydroxy-19-norandrost-4-ene;
17α-(2',3'-dichloromethylene-1',3'-dimethyl-prop-1'-en-1'-yl)-17β-hydroxy-19-norandrost-4-ene;
17α-(2',3'-dichloromethylene-1',3',3'-trimethyl-prop-1'-en-1'-yl)-17β-hydroxy-19-norandrost-4-ene;
17α-(2',3'-dichloromethylene-prop-1'-en-1'-yl)-17β-hydroxy-18-methyl-19-norandrost-4-ene;
17α-(2',3'-dichloromethylene-1'-methyl-prop-1'-en-1'-yl)-17β-hydroxy-18-methyl-19-norandrost-4-ene;
17α-(2',3'-dichloromethylene-3'-methyl-prop-1'-en-1'-yl)-17β-hydroxy-18-methyl-19-norandrost-4-ene;
17α-(2',3'-dichloromethylene-3',3'-dimethyl-prop-1'-en-1'-yl)-17β-hydroxy-18-methyl-19-norandrost-4-ene;
17α-(2',3'-dichloromethylene-1',3'-dimethyl-prop-1'-en-1'-yl)-17β-hydroxy-18-methyl-19-norandrost-4-ene;
17α-(2',3'-dichloromethylene-1',3',3'-trimethyl-prop-1'-en-1'-yl)-17β-hydroxy-18-methyl-19-norandrost-4-ene.

Similarly, the corresponding androst forms of the above 3-desoxy-19-norandrost compounds are respectively prepared from the corresponding androst precursors. The corresponding 17α-(dibromomethylene-prop-1'-en-1'-yl);
17α-(difluoromethylene-prop-1'-en-1'-yl);
17α-(bromochloromethylene-prop-1'-en-1'-yl);
17α-(bromofluoromethylene-prop-1'-en-1'yl); and
17α-(chlorofluoromethylene-prop-1'-en-1'-yl)

forms of the above 3-desoxy-17β-hydroxy compounds, including the androst series, are also respectively prepared, according to the above procedure from the corresponding 17β-acetoxy compounds.

EXAMPLE 7

This example illustrates methods of converting 17β-hydroxy groups to 17β-ethers. In this example 2 ml. of dihydropyran is added to a solution of 1 g. of 17β-hydroxy-17α-(2',3'-dibromomethylene-prop-1'-en-1'-yl)-19-norandrost-4-en-3-one in 15 ml. of benzene. The mixture is then heated at reflux until about 1 ml. is distilled off, to remove moisture, then cooled and 10 mg. of p-toluenesulfonic acid is added. This mixture is allowed to stand at room temperature for 4 days, and is then first washed with aqueous sodium carbonate solution, then water, and then dried and evaporated. The residue is chromatographed on neutral alumina, eluting with hexane affords 17α-(2',3'-dibromomethylene-prop-1'-en-1'-yl)-17β-(tetrahydropyran-2'-yloxy)-19-norandrost-4-en-3-one which is further purified by recrystallization from pentane.

Similarly, following the above procedure, the following 17β-ethers are prepared from the corresponding 17β-hydroxy steroids:

17α-(2',3'-dichloromethylene-1'-methyl-prop-1'-en-1'-yl)-17β-(tetrahydropyran-2'-yloxy)-19-androst-4-en-3-one;
17α-(2',3'-dichloromethylene-3'-methyl-prop-1'-en-1'-yl)-17β-(tetrahydropyran-2'-yloxy)-19-norandrost-4-en-3-one;
17α-(2',3'-bromochloromethyl-1',3'-dimethyl-prop-1'-en-1'-yl)-17β-(tetrahydropyran-2'-yloxy)-19-norandrost-4-en-3-one;
17α-(2',3'-difluoromethylene-3',3'-dimethyl-prop-1'-en-1'-yl)-17β-(tetrahydropyran-2'-yloxy)-19-norandrost-4-en-3-one;
17α-(2',3'-bromofluoromethylene-1',3',3'-trimethyl-prop-1'-en-1'-yl)-17β-(tetrahydropyran-2'-yloxy)-19-norandrost-4-en-3-one;
17α-(2',3'-dibromomethylene-1'-methyl-1'-en-1'-yl)-18-methyl-17β-(tetrahydropyran-2'-yloxy)-19-norandrost-4-en-3-one;
17α-(2',3'-bromofluoromethylene-1',3',3'-trimethyl-1'-en-1'-yl)18-methyl-17β-(tetrahydropyran-2'-yloxy)-19-norandrost-4-en-3-one;
17α-(2',3'-dichloromethylene-1'-methyl-prop-1'-en-1'-yl)-17β-(tetrahydropyran-2'-yloxy)-androst-4-en-3-one;
17α-(2',3'-dichloromethylene-3'-methyl-prop-1'-en-1'-yl)-17β-(tetrahydropyran-2'-yloxy)-androst-4-en-3-one;

17α-(2',3'-bromochloromethylene-1',3'-dimethylprop-1'-en-1'-yl)-17β-(tetrahydropyran-2'-yloxy)-androst-4-en-3-one;
17α-'2',3'-difluoromethylene-3',3'-dimethyl-prop-1'-en-1'-yl)-17β-(tetrahydropyran-2'-yloxy)-androst-4-en-3-one;
17α-(2',3'-bromofluoromethylene-1',3',3'-trimethyl-prop-1'-en-1'-yl)-17β-(tetrahydropyran-2'-yloxy)-androst-4-en-3-one;
17α-(2',3'-dibromomethylene-1'-methyl-1'-en-1'-yl)-18-methyl-17β-(tetrahydropyran-2'-yloxy)-androst-4-en-3-one;
17α-(2',3'-bromofluoromethylene-1',3',3'-trimethyl-1'-en-1'-yl)-18-methyl-17β-(tetrahydropyran-2'-yloxy)-androst-4-en-3-one;
17α-(2',3'-dibromomethylene-prop-1'-en-1'-yl)-3-methoxy-17β-(tetrahydropyran-2'-yloxy)-estra-1,3,5(10)-triene;
17α-(2',3'-difluoromethylene-1'-methyl-prop-1'-en-1'-yl)-3-methoxy-17β-(tetrahydropyran-2'-yloxy)-estra-1,3,5(10)-triene;
17α-(2',3'-dibromomethylene-3'-methyl-prop-1'-en-1'-yl)-3-methoxy-17β-(tetrahydropyran-2'-yloxy)-estra-1,3,5(10)-triene;
17α-(2',3'-chloro-1',3'-dimethyl-prop-1'-en-1'-yl)-3-methoxy-17β-(tetrahydropyran-2'-yloxy)-estra-1,3,5(10)-triene;
17α-(2',3'-bromochloro-3',3'-dimethyl-prop-1'-en-1'-yl)-3-methoxy-17β-(tetrahydropyran-2'-yloxy)-estra-1,3,5(10)-triene;
17α-(2',3'-chlorofluoro-1',3',3'-trimethyl-prop-1'-en-1'-yl)-3-methoxy-17β-(tetrahydropyran-2'-yloxy)-estra-1,3,5(10)-triene;
17α-(2',3'-dibromomethylene-prop-1'-en-1'-yl)-3-methoxy-18-methyl-17β-(tetrahydropyran-2'-yloxy)-estra-1,3,5(10)-triene;
17α-(2',3'-difluoromethylene-1'-methyl-prop-1'-en-1'-yl)-3-methoxy-18-methyl-17β-(tetrahydropyran-2'-yloxy)-estra-1,3,5(10)-triene;
17α-(2',3'-dibromomethylene-3'-methyl-prop-1'-en-1'-yl)-3-methoxy-18-methyl-17β-(tetrahydropyran-2'-yloxy)-estra-1,3,5(10)-triene;
17α(2',3'-dichloromethylene-1',3'-dimethyl-prop-1'-en-1'-yl)-3-methoxy-18-methyl-17β-(tetrahydropyran-2'-yloxy)-estra-1,3,5(10)-triene;
17α-(2',3'-bromochloro-3',3'-dimethyl-prop-1'-en-1'-yl)-3-methoxy-18-methyl-17β-(tetrahydropyran-2'-yloxy)-estra-1,3,5(10)-triene;
17α-(2',3'-chlorofluoro-1',3',3'-trimethyl-prop-1'-en-1'-yl)-3-methoxy-18-methyl-17β-(tetrahydropyran-2'-yloxy)-1,3,5(10)-triene;
17α-butatrienyl-17β-(tetrahydropyran-2'-yloxy)-19-norandrost-4-en-3-one;
17α-(1'-methyl-butatrien-1'-yl)-17β-(tetrahydropyran-2'-yloxy)-19-norandrost-4-en-3-one;
17α-(4'-methyl-butatrien-1'-yl)-17β-(tetrahydropyran-2'-yloxy)-19-norandrost-4-en-3-one;
17α-(1',4'-dimethyl-butatrien-1'-yl)-17β-(tetrahydropyran-2'-yloxy)-19-norandrost-4-en-3-one;
17α-(4',4'-dimethyl-butatrien-1'-yl)-17β-(tetrahydropyran-2'-yloxy)-19-norandrost-4-en-3-one;
17α-(1',4',4'-trimethyl-butatrien-1'-yl)-17β-(tetrahydropyran-2'-yloxy)-19-norandrost-4-en-3-one;
18-methyl-17α-(1'methyl-butatrien-1'-yl)-17β-(tetrahydropyran-2'-yloxy)-19-norandrost-4-en-3-one;
18-methyl-17α-(1',4',4'-trimethyl-butatrien-1'-yl)-17β-(tetrahydropyran-2'-yloxy)-19-norandrost-4-en-3-one;
17α-butatrienyl-17β-(tetrahydropyran-2'-yloxy)-androst-4-en-3-one;
17α-(1'-methyl-butatrien-1'-yl)-17β-(tetrahydropyran-2'-yloxy)-androst-4-en-3-one;
17α-(4'-methyl-butatrien-1'-yl)-17β-(tetrahydropyran-2'-yloxy)-androst-4-en-3-one;
17α-(1',4'-dimethyl-butatrien-1'-yl)-17β-(tetrahydropyran-2'-yloxy)-androst-4-en-3-one;
17α-(4',4'-dimethyl-butatrien-1'-yl)-17β-(tetrahydropyran-2'-yloxy)-androst-4-en-3-one;
17α-(1',4',4'-trimethyl-butatrien-1'-yl)-17β-(tetrahydropyran-2'-yloxy)-androst-4-en-3-one;
18-methyl-17α-(1'-methyl-butatrien-1'-yl)-17β-(tetrahydropyran-2'-yloxy)-androst-4-en-3-one;
18-methyl-17α-(1',4',4'-trimethyl-butatrien-1'-yl)-17β-(tetrahydropyran-2'-yloxy)-androst-4-en-3-one;
17α-butatrienyl-3-methoxy-17β-(tetrahydropyran-2'-yloxy)-estra-1,3,5(10)-triene;
3-methoxy-17α-(1'-methyl-butatrien-1'-yl)-17β-(tetrahydropyran-2'-yloxy)-estra-1,3,5(10)-triene;
3-methoxy-17α-(4'-methyl-butatrien-1'-yl)-17β-(tetrahydropyran-2'-yloxy)-estra-1,3,5(10)-triene;
3-methoxy-17α-(1',4'-dimethyl-butatrien-1'-yl)-17β-(tetrahydropyran-2'-yloxy)-estra-1,3,5(10)-triene;
3-methoxy-17α-(4',4'-dimethyl-butatrien-1'-yl)-17β-(tetrahydropyran-2'-yloxy)-estra-1,3,5(10)-triene;
3-methoxy-17α-(1',4',4'-trimethyl-butatrien-1'-yl)-17β-(tetrahydropyran-2'-yloxy)-estra-1,3,5(10)-triene;
17α-butatrienyl-3-methoxy-18-methyl-17β-(tetrahydropyran-2'-yloxy)-estra-1,3,5(10)-triene;
3-methoxy-18-methyl-17α-(1'-methyl-butatrien-1'-yl)-17β-(tetrahydropyran-2'-yloxy)-estra-1,3,5(10)-triene;
3-methoxy-18-methyl-17α-(4'-methyl-butatriene-1'-yl)-17β-(tetrahydropyran-2'-yloxy)-estra-1,3,5(10)-triene;
3-methoxy-18-methyl-17α-(1',4'-dimethyl-butatrien-1'-yl)-17β-(tetrahydropyran-2'-yloxy)-estra-1,3,5(10)-triene;
3-methoxy-18-methyl-17α-(4',4'-dimethyl-butatriene-1'-yl)-17β-(tetrahydropyran-2'-yloxy)-estra-1,3,5(10)-triene;
3-methoxy18-methyl-17α-(1',4',4'-trimethyl-butatrien-1'-yl)-17β-(tetrahydropyran-2'-yloxy)-estra-1,3,5(10)-triene.

By following the same procedure, the 3-desoxy-17β-hydroxy compounds prepared according to Example 6 are converted to the corresponding 3-desoxy-17β-tetrahydropyran-2'-yloxy compounds.

EXAMPLE 8

This example illustrates methods for selectively converting 3,17β-dihydroxy groups to 3-ester-17β-hydroxy groups. In this example 1 g. of acetic anhydride is added to a solution of 1 g. of 17α-(2',3'-dichloromethylene-prop-1'-en-1'-yl)-3β,17β-dihydroxy-19-norandrost - 4 - ene in 50 ml. of pyridine and the mixture allowed to stand for 5 hours. At the end of this time, the reaction mixture is precipitated with water and the precipitate filtered off and dried affording a 3β-acetoxy-17α-(2',3'-dichloromethylene-prop-1'-en-1'-yl)-17β - hydroxy - 19 - norandrost-4-ene is then recrystallized from acetone-hexane. By following the same procedure using the corresponding 3β,17β-dihydroxy - 17α - dihalomethylene-prop-1'-en-1'-yl steroids as starting materials, the following compounds are respectively prepared:

3β-acetoxy-17α-(2',3'-dichloromethylene-1'-methyl-prop-1'-en-1'-yl)-17β-hydroxy-19-norandrost-4-ene;
3β-acetoxy-17α-(2',3'-dibromomethylene-3'-methyl-prop-1'-en-1'-yl)-17β-hydroxy-19-norandrost-4-ene;
3β-acetoxy-17α-(2',3'-difluoromethylene-1',3'-dimethyl-prop-1'-en-1'-yl)-17β-hydroxy-19-norandrost-4-ene;
3β-acetoxy-17α-(2',3'-bromochloromethylene-3',3'-dimethyl-prop-1'-en-1'-yl)-17β-hydroxy-19-norandrost-4-ene;
3β-acetoxy-17α-(2',3'-bromofluoromethylene-1',3',3'-trimethyl-prop-1'-en-1'-yl)-17β-hydroxy-19-norandrost-4-ene;

3β-acetoxy-17α-(2',3'-chlorofluoromethylene-prop-1'-en-1'-yl)-17β-hydroxy-18-methyl-19-norandrost-4-ene;
3β-acetoxy-17α-(2',3'-difluoromethylene-1'-methyl-prop-1'-en-1'-yl)-17β-hydroxy-18-methyl-19-norandrost-4-en;
3β-acetoxy-17α-(2',3'-dichloromethylene-3'-methyl-prop-1'-en-1'-yl)-17β-hydroxy-18-methyl-19-norandrost-4-ene;
3β-acetoxy-17α-(2',3'-dibromomethylene-1',3'-dimethyl-prop-1'-en-1'-yl)-17β-hydroxy-18-methyl-19-norandrost-4-ene;
3β-acetoxy-17α-(2',3'-bromofluoromethylene-3',3'-dimethyl-prop-1'-en-1'-yl)-17β-hydroxy-18-methyl-19-norandrost-4-ene;
3β-acetoxy-17α-(2',3'-bromochloromethylene-1',3',3'-trimethyl-prop-1'-en-1'-yl)-17β-hydroxy-18-methyl-19-norandrost-4-ene;
3β-acetoxy-17α-(2',3'-dichloromethylene-1'-methyl-prop-1'-en-1'-yl)-17β-hydroxy-androst-4-ene;
3β-acetoxy-17α-(2',3'-dibromomethylene-3'-methyl-prop-1'-en-1'-yl)-17β-hydroxy-androst-4-ene;
3β-acetoxy-17α-(2',3'-difluoromethylene-1',3'-dimethyl-prop-1'-en-1'-yl)-17β-hydroxy-androst-4-ene;
3β-acetoxy-17α-(2',3'-bromochloromethylene-3',3'-dimethyl-prop-1'-en-1'-yl)-17β-hydroxy-androst-4-ene;
3β-acetoxy-17α-(2',3'-bromofluoromethylene-1',3',3'-trimethyl-prop-1'-en-1'-yl)-17β-hydroxy-androst-4-ene;
3β-acetoxy-17α-(2',3'-chlorofluoromethylene-prop-1'-en-1'-yl)-17β-hydroxy-18-methyl-androst-4-ene;
3β-acetoxy-17α-(2',3'-difluoromethylene-1'-methyl-prop-1'-en-1'-yl)-17β-hydroxy-18-methyl-androst-4-ene;
3β-acetoxy-17α-(2',3'-dichloromethylene-3'-methyl-prop-1'-en-1'-yl)-17β-hydroxy-18-methyl-androst-4-ene;
3β-acetoxy-17α-(2',3'-dibromomethylene-1',3'-dimethyl-prop-1'-en-1'-yl)-17β-hydroxy-18-methyl-androst-4-ene;
3β-acetoxy-17α-(2',3'-bromofluoromethylene-3',3'-dimethyl-prop-1'-en-1'-yl)-17β-hydroxy-18-methyl-androst-4-ene;
3β-acetoxy-17α-(2',3'-bromochloromethylene-1',3',3'-trimethyl-prop-1'-en-1'-yl)-17β-hydroxy-18-methyl-androst-4-ene;
3-acetoxy-17α-(2',3'-dichloromethylene-1'-methyl-prop-1'-en-1'-yl)-17β-hydroxy-estra-1,3,5(10)-triene;
3-acetoxy-17α-(2',3'-dibromomethylene-3'-methyl-prop-1'-en-1'-yl)-17β-hydroxy-estra-1,3,5(10)-triene;
3-acetoxy-17α-(2',3'-difluoromethylene-1',3'-dimethyl-prop-1'-en-1'-yl)-17β-hydroxy-estra-1,3,5(10)-triene;
3-acetoxy-17α-(2',3'-bromochloromethylene-3',3'-dimethyl-prop-1'-en-1'-yl)-17β-hydroxy-estra-1,3,5(10)-triene;
3-acetoxy-17α(2',3'-bromofluoromethylene-1',3',3'-trimethyl-prop-1'-en-1'-yl)-17β-hydroxy-estra-1,3,5(10)-triene;
3-acetoxy-17α-(2',3'-chlorofluoromethylene-prop-1'-en-1'-yl)-17β-hydroxy-18-methyl-estra-1,3,5(10)-triene;
3-acetoxy-17α-(2',3'-difluoromethylene-1'-methyl-prop-1'-en-1'-yl)-17β-hydroxy-18-methyl-estra-1,3,5(10)-triene;
3-acetoxy-17α-(2',3'-dichloromethylene-3'-methyl-prop-1'-en-1'-yl)-17β-hydroxy-18-methyl-estra-1,3,5(10)-triene;
3-acetoxy-17α-(2',3'-dibromomethylene-1',3'-dimethyl-prop-1'-en-1'-yl)-17β-hydroxy-18-methyl-estra-1,3,5(10)-triene;
3-acetoxy-17α-(2',3'-bromofluoromethylene-3',3'-dimethyl-prop-1'-en-1'-yl)-17β-hydroxy-18-methyl-estra-1,3,5(10)-triene;
3-acetoxy-17α-(2',3'-bromochloromethylene-1',3',3'-trimethyl-prop-1'-en-1'-yl)-17β-hydroxy-18-methyl-estra-1,3,5(10)-triene.

By following the above procedure but using the corresponding 3β,17β - dihydroxy - 17α - butatrienyl steroids as starting materials, the following compounds are respectively prepared:

3β-acetoxy-17α-butatrienyl-17β-hydroxy-19-norandrost-4-ene;
3β-acetoxy-17β-hydroxy-17α-(1'-methyl-butatrien-1'-yl)-19-norandrost-4-ene;
3β-acetoxy-17β-hydroxy-17α-(4'-methyl-butatrien-1'-yl)-19-norandrost-4-ene;
3β-acetoxy-17β-hydroxy-17α-(1',4'-dimethyl-butatrien-1'-yl)-19-norandrost-4-ene;
3β-acetoxy-17β-hydroxy-17α-(4',4'-dimethyl-butatrien-1'-yl)-19-norandrost-4-ene;
3β-acetoxy-17β-hydroxy-17α(1',4',4'-trimethyl-butatrien-1'-yl)-19-norandrost-4-ene;
3β-acetoxy-17α-butatrienyl-17β-hydroxy-18-methyl-19-norandrost-4-ene;
3β-acetoxy-17β-hydroxy-17α-(1'-methyl-butatrien-1'-yl)-18-methyl-19-norandrost-4-ene;
3β-acetoxy-17β-hydroxy-17α(4'-methyl-butatrien-1'-yl)-18-methyl-19-norandrost-4-ene;
3β-acetoxy-17β-hydroxy-17α-(1',4'-dimethyl-butatrien-1'-yl)-18-methyl-19-norandrost-4-ene;
3β-acetoxy-17β-hydroxy-17α-(4',4'-dimethyl-butatrien-1'-yl)-18-methyl-19-norandrost-4-ene;
3β-acetoxy-17β-hydroxy-17α-(1',4',4'-trimethyl-butatrien-1'-yl)-18-methyl-19-norandrost-4-ene;
3β-acetoxy-17α-butatrienyl-17β-hydroxy-androst-4-ene;
3β-acetoxy-17β-hydroxy-17α-(1'-methyl-butatrien-1'-yl)-androst-4-ene;
3β-acetoxy-17β-hydroxy-17α-(4'-methyl-butatrien-1'-yl)-androst-4-ene;
3β-acetoxy-17β-hydroxy-17α-(1',4'-dimethyl-butatrien-1'-yl)-androst-4-ene;
3β-acetoxy-17β-hydroxy-17α-(4',4'-dimethyl-butatrien-1'-yl)-androst-4-ene;
3β-acetoxy-17β-hydroxy-17α-(1',4',4'-trimethyl-butatrien-1'-yl)-androst-4-ene;
3β-acetoxy-17β-hydroxy-17α-(1'-methyl-butatrien-1'-yl)-18-methyl-androst-4-ene;
3β-acetoxy-17β-hydroxy-17α(4'-methyl-butatrien-1'-yl)-18-methyl-androst-4-ene;
3β-acetoxy-17β-hydroxy-17α-(1',4'-dimethyl-butatrien-1'-yl)-18-methyl-androst-4-ene;
3β-acetoxy-17β-hydroxy-17α-(4',4'-dimethyl-butatrien-1'-yl)-18-methyl-androst-4-ene;
3β-acetoxy-17β-hydroxy-17α-(1',4',4'-trimethyl-butatrien-1'-yl)-18-methyl-androst-4-ene;
3β-acetoxy-17α-butatrienyl-17β-hydroxy-estra-1,3,5(10)-triene;
3-acetoxy-17β-hydroxy-17α-yl'-methyl-butatrien-1'-yl)-estra-1,3,5(10)-triene;
3-acetoxy-17β-hydroxy-17α-(4'-methyl-butatrien-1'-yl)-estra-1,3,5(10)-triene;
3-acetoxy-17β-hydroxy-17α-(1',4'-dimethyl-butatrien-1'-yl)-estra-1,3,5(10)-triene;
3-acetoxy-17β-hydroxy-17α-(4',4'-dimethyl-butatrien-1'-yl)-estra-1,3,5(10)-triene;
3-acetoxy-17β-hydroxy-17α-(1',4',4'-trimethyl-butatrien-1'-yl)-estra-1,3,5(10)-triene;
3-acetoxy-17α-butatrienyl-17β-hydroxy-18-methyl-estra-1,3,5(10)-triene;

3-acetoxy-17β-hydroxy-17α-(1'-methyl-butatrien-1'-yl)-
   18-methyl-estra-1,3,5(10)-triene;
3-acetoxy-17β-hydroxy-17α-(4'-methyl-butatrien-1'-yl)-
   18-methyl-estra-1,3,5(10)-triene;
3-acetoxy-17β-hydroxy-17α-(1',4'-dimethyl-butatrien-
   1'-yl)-18-methyl-estra-1,3,5(10)-triene;
3-acetoxy-17β-hydroxy-17α-(4',4'-dimethyl-butatrien-
   1'-yl)-18-methyl-estra-1,3,5(10)-triene;
3-acetoxy-17β-hydroxy-17α-(1',4',4'-trimethyl-butatrien-
   1'-yl)-18-methyl-estra-1,3,5(10)-triene.

EXAMPLE 9

This example illustrates ester-substitution at the 17β-position. In this example, 0.7 g. of 17α-(2',3'-difluoromethylene - prop-1'-en-yl)-17β-hydroxy-19-norandrost-4-en-3-one is dissolved in 60 ml. of anhydrous tetrahydrofuran and 1.2 molar equivalents of ethylmagnesium bromide in ether is added. After a few minutes, 1.2 molar equivalents of propionyl chloride is added. The mixture is allowed to stand at room temperature for 15 hours, then diluted with water, and extracted with methylene chloride. The extracts are washed with water to neutrality, dried and evaporated. The residue is chromatographed on neutral alumina, eluting with ether:hexane affords 17α-(2',3'-difluoromethylene-prop-1'-en-1'-yl) - 17β - propionoxy-19-norandrost-4-ene-3-one.

By following the above procedure using the corresponding 17β-hydroxy steroids as starting materials, the following 17β-esters are prepared:

17α-(2',3'-dichloromethylene-1'-methyl-prop-1'-en-1'-yl)-
   17β-propionoxy-19-norandrost-4-en-3-one;
17α-(2',3'-dichloromethylene-3'-methyl-prop-1'-en-1'-yl)-
   17β-propionoxy-19-norandrost-4-en-3-one;
17α-(2',3'-bromochloromethylene-1',3'-dimethyl-prop-1'-
   en-1'-yl)-17β-propionoxy-19-norandrost-4-en-3-one;
17α-(2',3'-difluoromethylene-3',3'-dimethyl-prop-1'-en-
   1'-yl)-17β-propionoxy-19-norandrost-4-en-3-one;
17α-(2',3'-bromofluoromethylene-1',3',3'-trimethyl-prop-
   1'-en-1'-yl)-17β-propionoxy-19-norandrost-
   4-en-3-one;
17α-(2',3'-dibromomethylene-prop-1'-en-1'-yl)-18-methyl-
   17β-propionoxy-19-norandrost-4-en-3-one;
17α-(2',3'-dibromomethylene-1'-methyl-1'-en-1'-yl)-18-
   methyl-17β-propionoxy-19-norandrost-4-en-3-one;
17α-(2',3'-bromofluoromethylene-1',3',3'-trimethyl-
   1'-en-1'-yl)-18-methyl-17β-propionoxy-
   19-norandrost-4-en-3-one;
17α-(2',3'-dichloromethylene-prop-1'-en-1'-yl)-
   17β-propionoxy-androst-4-en-3-one;
17α-(2',3'-dichloromethylene-1'-methyl-prop-1'-en-1'-yl)-
   17β-propionoxy-androst-4-en-3-one;
17α-(2',3'-dichloromethylene-3'-methyl-prop-1'-en-
   1'-yl)-17β-propionoxy-androst-4-en-3-one;
17α-(2',3'-bromochloromethylene-1',3'-dimethyl-prop-1'-
   en-1'-yl)-17β-propionoxy-androst-4-en-3-one;
17α-(2',3'-difluoromethylene-3',3'-dimethyl-prop-1'-en-
   1'-yl)-17β-propionoxy-androst-4-en-3-one;
17α-(2',3'-bromofluoromethylene-1',3',3'-trimethyl-prop-
   1'-en-1'-yl)-17β-propionoxy-androst-4-en-3-one;
17α-(2',3'-dibromomethylene-1'-methyl-1'-en-1'-yl)-
   18-methyl-17β-propionoxy-androst-4-en-3-one;
17α-(2',3'-bromofluoromethylene-1',3',3'-trimethyl-1'-en-
   1'-yl)-18-methyl-17β-propionoxy-androst-
   4-en-3-one;
17α-(2',3'-dibromomethylene-prop-1'-en-1'-yl)-3-ethoxy-
   17β-propionoxy-estra-1,3,5(10)-triene;
17α-(2',3'-difluoromethylene-1'-methyl-prop-1'-en-1'-yl)-
   3-ethoxy-17β-propionoxy-estra-1,3,5(10)-triene;
17α-(2',3'-dibromomethylene-3'-methyl-prop-1'-en-1'-yl)-
   3-ethoxy-17β-propionoxy-estra-1,3,5(10)-triene;
17α-(2',3'-chloro-1',3'-dimethyl-prop-1'-en-1'-yl)-3-
   ethoxy-17β-propionoxy-estra-1,3,5(10)-triene;
17α-(2',3'-bromochloro-3',3'-dimethyl-prop-1'-en-1'-yl)-
   3-ethoxy-17β-propionoxy-estra-1,3,5(10)-triene;
17α-(2',3'-chlorofluoro-1',3',3'-trimethyl-prop-1'-en-
   1'-yl)-3-ethoxy-17β-propionoxy-estra-
   1,3,5(10)-triene;
17α-(2',3'-dibromomethylene-prop-1'-en-1'-yl)-3-ethoxy-
   18-methyl-17β-propionoxy-estra-1,3,5(10)-triene;
17α-(2',3'-difluoromethylene-1'-methyl-prop-1'-en-1'-yl)-
   3-ethoxy-18-methyl-17β-propionoxy-estra-
   1,3,5(10)triene;
17α-(2',3'-dibromomethylene-3'-methyl-prop-1'-en-1'-yl)-
   3-ethoxy-18-methyl-17β-propionoxy-estra
   1,3,5(10)triene;
17α-(2',3'-dichloromethylene-1',3'-dimethyl-prop-1'-en-
   1'-yl)-3-ethoxy-18-methyl-17β-propionoxy-
   estra-1,3,5(10)-triene;
17α-(2',3'-bromochloro-3',3'-dimethyl-prop-1'-en-1'-yl)-
   3-ethoxy-18-methyl-17β-propionoxy-estra-
   1,3,5(10)-triene;
17α-(2',3'-chlorofluoro-1',3',3'-trimethyl-prop-1'-en-
   1'-yl)-3-ethoxy-18-methyl-17β-propionoxy-
   estra-1,3,5(10)-triene;
17α-butatrienyl-17β-propionoxy-9-norandrost-4-en-3-one;
7α-(1'-methyl-butatrien-1'-yl)-17β-propionoxy-19-
   norandrost-4-en-3-one;
17α-(4'-methyl-butatrien-1'-yl)-17β-propionoxy-
   19-norandrost-4-en-3-one;
17α-(1',4'-dimethyl-butatrien-1'-yl)-17β-propionoxy-
   19-norandrost-4-en-3-one;
17α-(4',4'-dimethyl-butatrien-1'-yl)-17β-propionoxy-
   19-norandrost-4-en-3-one;
17α-(1',4',4'-trimethyl-butatrien-1'-yl)-17β-propionoxy-
   19-norandrost-4-en-3-one;
18-methyl-17α-(1'-methyl-butatrien-1'-yl)-17β-propi-
   onoxy-19-norandrost-4-en-3-one;
18-methyl-17α-(1',4',4'-trimethyl-butatrien-1'-yl)-17β-
   propionoxy-19-norandrost-4-en-3-one;
17α-butatrien-1'-17β-propionoxy-androst-4-en-3-one;
17α-(1'-methyl-butatrien-1'-yl)-17β-propionoxy-
   androst-4-en-3-one;
17α-(4'-methyl-butatrien-1'-yl)-17β-propionoxy-
   androst-4-en-3-one;
17α-(1',4'-dimethyl-butatrien-1'-yl)-17β-propionoxy-
   androst-4-en-3-one;
17α-(4',4'-dimethyl-butatrien-1'-yl)-17β-propionoxy-
   androst-4-en-3-one;
17α-(1',4',4'-trimethyl-butatrien-1'-yl)-17β-propi-
   onoxyandrost-4-en-3-one;
18-methyl-17α-(1'-methyl-butatrien-1'-yl)-17β-propi-
   onoxyandrost-4-en-3-one;
18-methyl-17α-(1',4',4'-trimethyl-butatrien-1'-yl)-
   17β-propionoxy-androst-4-en-3-one;
17α-butatrienyl-3-ethoxy-17β-propionoxy-estra-
   1,3,5(10)-triene;
3-ethoxy-17α-(1'-methyl-butatrien-1'-yl)-17β-propi-
   onoxy-estra-1,3,5(10)-triene;
3-ethoxy-17α-(4'-methyl-butatrien-1'-yl)-17β-propi-
   onoxy-estra-1,3,5(10)-triene;
3-ethoxy-17α-(1',4'-dimethyl-butatrien-1'-yl)-17β-propi-
   onoxy-estra-1,3,5(10)-triene;
3-ethoxy-17α-(4',4'-dimethyl-butatrien-1'-yl)-17β-propi-
   onoxy-estra-1,3,5(10)-triene;
3-ethoxy-17α-(1',4',4'-trimethyl-butatrien-1'-yl)-17β-
   propionoxy-estra-1,3,5(10)-triene;
17α-butatrienyl-3-ethoxy-18-methyl-17β-propionoxy-
   estra-1,3,5(10)-triene;
3-ethoxy-17α-(1'-methyl-butatrien-1'-yl)-18-methyl-
   17β-propionoxy-estra-1,3,5(10)-triene;
3-ethoxy-17α-(4'-methyl-butatrien-1'-yl)-18-methyl-
   17β-propionoxy-estra-1,3,5(10)-triene;
3-ethoxy-17α-(1',4'-dimethyl-butatrien-1'-yl)-18-
   methyl-17β-propionoxy-estra-1,3,5(10)-triene;
3-ethoxy-17α-(4',4'-dimethyl-butatrien-1'-yl)-18-
   methyl-17β-propionoxy-estra-1,3,5(10)-triene;
3-ethoxy-17α-(1',4',4'-trimethyl-butatrien-1'-yl)-18-
   methyl-17β-propionoxy-estra-1,3,5(10)-triene;

EXAMPLE 10

This example illustrates methods of converting 3-keto-17β-hydroxy compounds to 3,17β-dihydroxy compounds and 3,17β-dihydroxy compounds to 3,17β-acylates. In this example a solution of 2 g. of lithium tri-t-butoxyaluminum hydride in 30 ml. of tetrahydrofuran is added with stirring to a solution of 2 g. of 17α-(2′,3′-dibromomethylene-prop - 1′ - en-1′-yl)-17β-hydroxy-19-norandrost-4-en-3-one in 40 ml. of tetrahydrofuran. The mixture is heated under reflux for 15 minutes. The excess reagent is then decomposed by the addition of water and saturated aqueous sodium sulfate solution. The organic phase is separated, dried over sodium sulfate and evaporated, affording a 17α-(2′,3′ - dibromomethylene - prop-1′-en-1′-yl-3β, 17β-dihydroxy-19-norandrost-4-ene residue which is further purified by recrystallization from acetone:hexane.

By following the same procedure using the corresponding 3-keto-17β-hydroxy starting materials, the following 3,17β-diols are prepared:

17α-(2′,3′-dichloromethylene-1′-methyl-prop-1′-en-1′-yl)-3β,17β-dihydroxy-19-norandrost-4-ene;
17α-(2′,3′-dichloromethylene-3′-methyl-prop-1′-en-1′-yl)-3β,17β-dihydroxy-19-norandrost-4-ene;
17α - (2′,3′-bromochloromethylene-1′,3′-dimethyl-prop-1′-en-1′-yl)-3β,17β-dihydroxy-19-norandrost-4-ene;
17α - (2′,3′ - difluoromethylene-3′,3′-dimethyl-prop-1′-en-1′-yl)-3β,17β-dihydroxy-19-norandrost-4-ene;
17α - (2′,3′-bromofluoromethylene-1′,3′,3′-trimethyl-prop-1′-en-1′-yl)-3β,17β-dihydroxy-19-norandrost-4-ene;
17α-(2′,3′-dibromoethylene-prop-1′-en-1′-yl)-3β,17β-dihydroxy-18-methyl-19-norandrost-4-ene;
17α - (2′,3′ - dibromomethylene-1′-methyl-prop-1′-en-1′-yl)-3β,17β-dihydroxy-18-methyl-19-norandrost-4-ene;
17α - (2′,3′-bromofluoromethylene-1′,3′,3′-trimethyl-prop-1′-en-1′-yl)-3β,17β-dihydroxy-18-methyl-19-norandrost-4-ene;
17α-(2′,3′-dibromomethylene-prop-1′-en-1′-yl)-3β,17β-dihydroxy-androst-4-ene;
17α-(2′,3′-dichloromethylene-1′-methyl-prop-1′-en-1′-yl)-3β,17β-dihydroxy-androst-4-ene;
17α-(2′,3′-dichloromethylene-3′-methyl-prop-1′-en-1′-yl)-3β,17β-dihydroxy-androst-4-ene;
17α - (2′,3′-bromochloromethylene-1′,3′-dimethyl-prop-1′-en-1′-yl)-3β,17β-dihydroxy-androst-4-ene;
17α-(2′,3′-difluoromethylene-3′,3′-dimethyl-prop-1′-en-1′-yl)-3β,17β-dihydroxy-androst-4-ene;
17α - (2′,3′-bromofluoromethylene-1′,3′,3′-trimethyl-prop-1′-en-1′-yl)-3β,17β-dihydroxy-androst-4-ene;
17α-(2′,3′-dibromomethylene-prop-1′-en-1′-yl)-3β,17β-dihydroxy-18-methyl-androst-4-ene;
17α - (2′,3′ - dibromomethylene - 1′-methyl-prop-1′-en-1′-yl)-3β,17β-dihydroxy-18-methyl-androst-4-ene;
17α - (2′,3′-bromofluoromethylene-1′,3′,3′-trimethyl-prop-1′-en-1′-yl)-3β,17β-dihydroxy-18-methyl-androst-4-ene;
17α-butatrienyl-3β,17β-dihydroxy-19-norandrost-4-ene;
3β,17β-dihydroxy-17α-(1′-methyl-butatrien-1′-yl)-19-norandrost-4-ene;
3β,17β-dihydroxy-17α-(4′-methyl-butatrien-1′-yl)-19-norandrost-4-ene;
3β,17β-dihydroxy-17α-(1′,4′-dimethyl-butatrien-1′-yl)-19-norandrost-4-ene;
3β,17β-dihydroxy-17α-(4′,4′-dimethyl-butatrien-1′-yl)-19-norandrost-4-ene;
3β,17-dihydroxy-17α-(1′,4′,4′-trimethyl-butatrien-1′-yl)-19-norandrost-4-ene;
3β,17β-dihydroxy-18-methyl-17α-(1′-methyl-butatrien-1′-yl)-19-norandrost-4-ene;
3β,17β-dihydroxy-18-methyl-17α-(1′,4′,4′-trimethyl-butatrien-1′-yl)-19-norandrost-4-ene;
17α-butatrienyl-3,17β-dihydroxy-androst-4-ene;
3β,17β-dihydroxy-17α-(1′-methyl-butatrien-1′-yl)-androst-4-ene;
3β,17β-dihydroxy-17α-(4′-methyl-butatrien-1′-yl)-androst-4-ene;
3β,17β-dihydroxy-17α-(1′,4′-dimethyl-butatrien-1′-yl)-androst-4-ene;
3β,17β-dihydroxy-17α-(4′,4′-dimethyl-butatrien-1′-yl)-androst-4-ene;
3β,17β-dihydroxy-17α-(1′,4′,4′-trimethyl-butatrien-1′-yl)-androst-4-ene;
3β,17β-dihydroxy-18-methyl-17α-(1′-methyl-butatrien-1′-yl)-17β-androst-4-ene;
3β,17β-dihydroxy-18-methyl-17α-(1′,4′,4′-trimethyl-butatrien-1′-yl)-androst-4-ene.

One gram of 17α-(2′,3′-dibromomethylene-prop-1′-en-1′-yl)-3β,17β-dihydroxy-19-norandrost - 4 - ene is mixed with 4 ml. of pyridine and 4 ml. of acetic anhydride and heated at 40° for 10 hours. The mixture is then poured into ice water and the resulting precipitate is collected by filtration. The precipitate is washed with water and dried affording a 3β,17β-diacetoxy-17α-(2′,3′-dibromomethylene-prop-1′-en-1′ - yl)-19-norandrost-4-ene residue which is further purified by recrystallization using an acetone:hexane solvent. By following the same procedure, the 3,17β-dihydroxy product produced above are converted to the corresponding 3,17β-diacetoxy compounds.

EXAMPLE 11

This example illustrates a method of preparing the compounds of Formula I of my invention. In this example 30 ml. of anhydrous ethyl ether containing 1.1 g. of 17α-(2′,3′-dibromomethylene-prop-1′-en-1′-yl)-17β-hydroxy-19-norandrost-4-en-3-one and 1.3 g. of activated magnesium shavings in suspension, is heated at reflux for 48 hours. The mixture is then poured into water containing 10% (wt.) hydrochloric acid. The ethyl ether layer is then separated by decantation, washed neutral with water, and evaporated affording a 17α-butatrienyl-17β-hydroxy-19-norandrost-4-en-3-one residue which is then further purified by chromatography over alumina sequentially eluting with hexane:benzene mixtures, benzene, and benzene:ether mixtures.

By following the above procedure using the corresponding 17α - (2′,3′-dibromomethylene-prop-1′-en-1′-yl) steroids as starting materials, the following compounds of Formulas II and III are prepared:

17β-hydroxy-17α-(1′-methyl-butatrien-1′-yl)-19-norandrost-4-en-3-one;
17β-hydroxy-17α-(4′-methyl-butatrien-1′-yl)-19-norandrost-4-en-3-one;
17β-hydroxy-17α-(1′,4′-dimethyl-butatrien-1′-yl)-19-norandrost-4-en-3-one;
17β-hydroxy-17α-(4′,4′-dimethyl-butatrien-1′-yl)-19-norandrost-4-en-3-one;
17β-hydroxy-17α-(1′,4′,4-trimethyl-butatrien-1′-yl)-19-norandrost-4-en-3-one;
17α-butatrienyl-17β-hydroxy-18-methyl-9-norandrost-4-en-3-one;
17β-hydroxy-17α-(1′-methyl-butatrien-1′-yl)-18-methyl-19-norandrost-4-en-3-one;
17β-hydroxy-17α-(4′-methyl-butatrien-1′-yl)-18-methyl-19-norandrost-4-en-3-one;
17β-hydroxy-17α-(1′,4′-dimethyl-butatrien-1′-yl)-18-methyl-19-norandrost-4-en-3-one;
17β-hydroxy-17α-(4′,4′-dimethyl-butatrien-1′-yl)-18-methyl-19-norandrost-4-en-3-one;
17β-hydroxy-17α-(1′,4′,4′-trimethyl-butatrien-1′-yl)-18-methyl-19-norandrost-4-en-3-one;
17β-acetoxy-17α-butatrienyl-19-norandrost-4-en-3-one;
17β-acetoxy-17α-(1′-methyl-butatrien-1′-yl)-19-norandrost-4-en-3-one;
17β-acetoxy-17α-(4′-methyl-butatrien-1′-yl)-19-norandrost-4-en-3-one;
17β-acetoxy-17α-(1′,4′-dimethyl-butatrien-1′-yl)-19-norandrost-4-en-3-one;

17β-acetoxy-17α-(4',4'-dimethyl-butatrien-1'-yl)-19-norandrost-4-en-3-one;
17β-acetoxy-17α-(1',4',4-trimethyl-butatrien-1'-yl)-19-norandrost-4-en-3-one;
17β-acetoxy-17α-butatrienyl-18-methyl-19-norandrost-4-en-3-one;
17β-acetoxy-17α-(1'-methyl-butatrien-1'-yl)-18-methyl-19-norandrost-4-en-3-one;
17β-acetoxy-17α-(4'-methyl-butatrien-1'-yl)-18-methyl-19-norandrost-4-en-3-one;
17β-acetoxy-17α-(1',4'-dimethyl-butatrien-1'-yl)-18-methyl-19-norandrost-4-en-3-one;
17β-acetoxy-17α-(4',4'-dimethyl-butatrien-1'-yl)-18-methyl-19-norandrost-4-en-3-one;
17β-acetoxy-17α-(1',4',4'-trimethyl-butatrien-1'-yl)-18-methyl-19-norandrost-4-en-3-one;
17α-butatrienyl-17β-(tetrahydropyran-2'-yloxy)-19-norandrost-4-en-3-one;
17β-(tetrahydropyran-2'-yloxy)-17α-(1'-methyl-butatrien-1'-yl)-19-norandrost-4-en-3-one;
17β-(tetrahydropyran-2'-yloxy)-17α-(4-methyl-butatrien-1'-yl)-19-norandrost-4-en-3-one;
17β-(tetrahydropyran-2'-yloxy)-17α-(1',4'-dimethyl-butatrien-1'-yl)-19-norandrost-4-en-3-one;
17β-(tetrahydropyran-2'-yloxy)-17α-(4',4'-dimethyl-butatrien-1'-yl)-19-norandrost-4-en-3-one;
17β-(tetrahydropyran-2'-yloxy)-17α-(1',4',4'-trimethyl-butatrien-1'-yl)-19-norandrost-4-en-3-one;
17α-butatrienyl-17β-(tetrahydropyran-2'-yloxy)-18-methyl-19-norandrost-4-en-3-one;
17β-(tetrahydropyran-2'-yloxy)-17α-(1'-methyl-butatrien-1'-yl)-18-methyl-19-norandrost-4-en-3-one;
17β-(tetrahydropyran-2'-yloxy)-17α-(4'-methyl-butatrien-1'-yl)-18-methyl-19-norandrost-4-en-3-one;
17β-(tetrahydropyran-2'-yloxy)-17α-(1',4'-dimethyl-butatrien-1'-yl)-18-methyl-19-norandrost-4-en-3-one;
17β-(tetrahydropyran-2'-yloxy)-17α-(4',4'-dimethyl-butatrien-1'-yl)-18-methyl-19-norandrost-4-en-3-one;
17β-(tetrahydropyran-2'-yloxy)-17α-(1',4',4'-trimethyl-butatrien-1'-yl)-18-methyl-19-norandrost-4-en-3-one;
17α-butatrienyl-17β-hydroxy-3-methoxy-19-norondrost-4-ene;
17β-hydroxy-3β-methoxy-17α-(1'-methyl-butatrien-1'-yl)-19-norandrost-4-ene;
17β-acetoxy-17α-butatrienyl-3β-methoxy-19-norandrost-4-ene;
17β-acetoxy-3β-methoxy-17α-(4'-methyl-butatrien-1'-yl)-19-norandrost-4-ene;
17α-butatrienyl-17β-(tetrahydropyran-2'-yloxy)-3β-methoxy-19-norandrost-4-ene;
17β-(tetrahydropyran-2'-yloxy)-3β-methoxy-17α-(1',4'-dimethyl-butatrien-1'-yl)-19-norandrost-4-ene;
3β-acetoxy-17α-butatrienyl-17β-hydroxy-18-methyl-19-norandrost-4-ene;
3β-acetoxy-17β-hydroxy-18-methyl-17α-(4',4'-dimethyl-butatrien-1'-yl)-19-norandrost-4-ene;
3β,17β-diacetoxy-17α-butatrienyl-18-methyl-19-norandrost-4-ene;
3β,17β-diacetoxy-18-methyl-17α-(1',4',4'-trimethyl-butatrien-1'-yl)-19-norandrost-4-ene;
3β-acetoxy-17α-butatrienyl-17β-(tetrahydropyran-2'-yloxy)-18-methyl-19-norandrost-4-ene;
3β-acetoxy-17β-(tetrahydropyran-2'-yloxy)-18-methyl-17α-(1'-methyl-butatrien-1'-yl)-19-norandrost-4-ene;
17α-butatrienyl-3β,17β-dihydroxy-19-norandrost-4-ene;
17α-butatrienyl-3β,17β-dihydroxy-18-methyl-19-norandrost-4-ene;
17β-acetoxy-17α-butatrienyl-3β-hydroxy-19-norandrost-4-ene;
17β-acetoxy-17α-butatrienyl-3β-hydroxy-18-methyl-19-norandrost-4-ene;
3β-acetoxy-17α-butatrienyl-17β-hydroxy-19-norandrost-4-ene;

3β-acetoxy-17α-butatrienyl-17β-hydroxy-18-methyl-19-norandrost-4-ene;
3β,17β-diacetoxy-17α-butatrienyl-19-norandrost-4-ene;
3β,17β-diacetoxy-17α-butatrienyl-18-methyl-19-norandrost-4-ene;
17α-butatrienyl-17β-hydroxy-18-methyl-19-norandrost-4-en-3-one;
17β-acetoxy-17α-butatrienyl-18-methyl-19-norandrost-4-ene-3-one;
17β-acetoxy-17α-butatrienyl-19-norandrost-4-ene;
17β-acetoxy-17α-(1'-methyl-butatrien-1'-yl)-19-norandrost-4-ene;
17β-acetoxy-17α-(4'-methyl-butatrien-1'-yl)-19-norandrost-4-ene;
17β-acetoxy-17α-(4',4'-dimethyl-butatrien-1'-yl)-19-norandrost-4-ene;
17β-acetoxy-17α-(1',4'-dimethyl-butatrien-1'-yl)-19-norandrost-4-ene;
17β-acetoxy-17α-(1',4',4'-trimethyl-butatrien-1'-yl)-19-norandrost-4-ene;
17β-acetoxy-17α-butatrienyl-18-methyl-19-norandrost-4-ene;
17β-acetoxy-18-methyl-17α-(1'-methyl-butatrien-1'-yl)-19-norandrost-4-ene;
17β-acetoxy-18-methyl-17α-(4'-methyl-butatrien-1'-yl)-19-norandrost-4-ene;
17β-acetoxy-18-methyl-17α-(4'4'-dimethyl-butatrien-1'-yl)-19-norandrost-4-ene;
17β-acetoxy-18-methyl-17α-(1',4'-dimethyl-butatrien-1'-yl)-19-norandrost-4-ene;
17β-acetoxy-18-methyl-17α-(1',4',4'-trimethyl-butatrien-1'-yl)-19-norandrost-4-ene.

By following the above procedure using the corresponding androst precursors in place of the 19-norandrost precursors, the corresponding androst forms of the above compounds are prepared. Similarly the below listed estra compounds are prepared from the corresponding estra precursors:

17α-butatrienyl-3-methoxy-17β-(tetrahydropyran-2'-yloxy)-estra-1,3,5(10)-triene;
3-methoxy-17α-(1'-methyl-butatrien-1'-yl)-17β-(tetrahydropyran-2'-yloxy)-estra-1,3,5(10)-triene;
3-methoxy-17α-(4'-methyl-butatrien-1'-yl)-17β-(tetrahydropyran-2'-yloxy)-estra-1,3,510)-triene;
3-methoxy-17α-(1',4',-dimethyl-butatrien-1'-yl)-17β-(tetrahydropyran-2'-yloxy)-estra-1,3,5(10)-triene;
3-methoxy-17α-(4',4'-dimethyl-butatrien-1'-yl)-17β-(tetrahydropyran-2'-yloxy)-estra-1,3,5(10)-triene;
3-methoxy-17α-(1',4',4'-trimethyl-butatrien-1'-yl)-17β-(tetrahydropyran-2'-yloxy)-estra-1,3,5(10)-triene;
17α-butatrienyl-3,17β-dihydroxy-estra-1,3,5(10)-triene;
3,17β-dihydroxy-17α-(1'-methyl-butatrien-1'-yl)-estra-1,3,5(10)-triene;
3,17β-dihydroxy-17α-(4'-methyl-butatrien-1'-yl)-estra-1,3,5(10)-triene;
3,17β-dihydroxy-17α-(1',4'-dimethyl-butatrien-1'-yl)-estra-1,3,5(10)-triene;
3,17β-dihydroxy-17α-(4',4'-dimethyl-butatrien-1(-yl)-estra-1,3,5,(10)-triene;
3,17β-dihydroxy-17α-(4',4'-dimethyl-butatrien-1'-yl)-estra-1,3,5(10)-triene;
17β-acetoxy-17α-butatrienyl-3-hydroxy-estra-1,3,5(10)-triene;
17β-acetoxy-3-hydroxy-17α-(1'-methyl-butatrien-1'-yl)-estra-1,3,5(10)-triene;
17β-acetoxy-3-hydroxy-17α-(4'-methyl-butatrien-1'-yl)-estra-1,3,5(10)-triene;
17β-acetoxy-3-hydroxy-17α-(1',4'-dimethyl-butatrien-1'-yl)-estra-1,3,5(10)-triene;
17β-acetoxy-3-hydroxy-17α-(4',4'-dimethyl-butatrien-1'-yl)-estra-1,3,5(10)-triene;

17β-acetoxy-3-hydroxy-17α-(1',4',4'-trimethyl-butatrien-1',yl)-estra-1,3,5(10)-triene;
3-acetoxy-17α-butatrienyl-17β-hydroxy-estra-1,3,5(10)-triene;
3-acetoxy-17β-hydroxy-17α-(1'-methyl-butatrien-1'-yl)-estra-1,3,5(10)-triene;
3-acetoxy-17β-hydroxy-17α-(4'-methyl-butatrien-1'-yl)-estra-1,3,5(10)-triene;
3-acetoxy-17β-hydroxy-17α-(1',4'-dimethyl-butatrien-1'-yl)-estra-1,3,5(10)-triene;
3-acetoxy-17β-hydroxy-17α-(4',4'-dimethyl-butatrien-1'-yl)-estra-1,3,5(10)-triene;
3-acetoxy-17β-hydroxy-17α-(1',4',4'-trimethyl-butatrien-1'-yl)-estra-1,3,5(10)-triene;
17β-acetoxy-17α-butatrienyl-3-methoxy-estra-1(3,5(10)-triene;
17β-acetoxy-3-methoxy-17α-(1'-methyl-butadien-1'-yl)-estra-1,3,5(10)-triene;
17β-acetoxy-3-methoxy-17α-(4'-methyl-butatrien-1'-yl)-estra-1,3,5(10)-triene;
17β-acetoxy-3-methoxy-17α-(1',4'-dimethyl-butatrien-1'-yl)-estra-1,3,5(10)-triene;
17β-acetoxy-3-methoxy-17α-(4',4'-dimethyl-butatrien-1'-yl)-estra-1,3,5(10)-triene;
3-acetoxy-17β-hydroxy-17α-(1',4',4'-trimethyl-butatrien-1'-yl)-estra-1,3,5(10)-triene;
3,17β-diacetoxy-17α-butatrienyl-estra-1,3,5(10)-triene;
3,17β-diacetoxy-17α-(1'-methyl-butatrien-1'-yl)-estra-1,3,5(10)-triene;
3,17β-diacetoxy-17α-(4'-methyl-butatrien-1'-yl)estra-1,3,5(10)-triene;
3,17β-diacetoxy-17α-(1',4'-dimethyl-butatrien-1'-yl)-estra-1,3,5(10)-triene;
3,17β-diacetoxy-17α-(4',4'-dimethyl-butatrien-1'-yl)-estra-1,3,5(10)-triene;
3,17β-diacetoxy-17α-(1',4',4'-trimethyl-butatrien-1'-yl)-estra-1,3,5(10)-triene;

By following the above procedure, the corresponding 18-methyl derivatives of the above estra compounds are also prepared from the corresponding 17α-dibromomethylene-propadienyl-18-methyl precursors.

The above compounds of Formulas II and III are also respectively prepared, according to the same procedure, from the corresponding 17α - (2',3'-dichloromethylene-prop - 1'-en-1'-yl) and 17α-(2'-3'-bromofluoromethylene-prop-1'-en-1-yl) steroids.

EXAMPLE 12

This example illustrates methods of preparing the compounds of Formula I of our invention. In this example 10 mmoles of 17α(2',3'-dibromomethylene-prop-1'-en-1'-yl) - 17β-(tetrahydropyran-2'-yloxy)-19-norandrost-4-en-3-one is added, under a nitrogen atmosphere, to a solution of 50 mmoles of cuprous chloride (CuCl) in 100 ml. of dimethylsulfoxide at 20° C. The mixture is maintained at this temperature for 93 hours, cooled and poured into water. The product is isolated by extraction with methylene dichloride. The residue is dissolved in hexane-benzene (1:1) and chromatographed over alumina eluting with hexane-benzene, benzene, and benzene-ether mixtures to yield 17α - butatrienyl-17β-tetrahydropyran-2'-yloxy)-19-norandrost-4-en-3-one. The compounds prepared according to Example 11 are also prepared by the above procedure using each of their corresponding 17α-(2',3'-dibromomethylene - prop-1'-yl); 17α-(2',3'-dichloromethylene - prop-1'-yl); 17α-(2',2'-bromochloromethylene-prop-1'-yl) and 17α - (2',3'-bromofluoromethylene-prop-1'-yl) steroid precursors as starting materials.

The above compounds are also prepared according to a first modified procedure wherein after the treatment at 20° C. for 93 hours, the reaction mixture is heated at 50° C. for 32 hours; and also according to a second modified procedure wherein in place of the treatment at 20° C. for 93 hours, the reaction mixture is heated at 80° C. for 18 hours. In each of the modified procedure, the reaction mixture is allowed to cool to room temperature prior to being processed and chromatographed.

EXAMPLE 13

This example illustrates methods of preparing the compounds of Formula II. In this example 1 me. of 17α-(2',3'-dichloromethylene - prop - 1'-en-1'-yl)-3,17β-bis(tetrahydropyran-2'-yloxy)-estra-1,3,5(10)-triene is dissolved in 40 ml. of anhydrous ether. The resulting solution is added dropwise, over a 10 minute period, to a mixture of 3 me. of butyl lithium in an anhydrous ether at —35° C. with stirring. The reaction mixture is maintained at —35° C. for an additional hour and then allowed to rise to room temperature (i.e. about 20° C.). The reaction mixture is then poured into water and extracted with methylene chloride. The extracts are combined and washed with water, dried and evaporated to dryness affording a 17α-butatriene - 3β,17β - bis(tetrahydropyran - 2' - yloxy)-estra-1,3,5(10)-triene residue, which is then further purified by chromatography over alumina and recrystallization from hexane:acetone.

By following the same procedure using the corresponding 17α - (2',3'-dichloromethylene-prop-1'-en-1'-yl) starting materials, the following compounds are prepared:

17α-(1'-methyl-butatriene-1'-yl)-3,17β-bis(tetrahydropyran-2'-yloxy)-estra-1,3,5(10)-triene;
17β-(4'-methyl-butatrien-1'-yl)-3,17β-bis(tetrahydropyran-2'-yloxy)-estra-1,3,5(10)-triene;
17α-(1',4'-dimethyl-butatrien-1'-yl)-3,17β-bis(tetrahydropyran-2'-yloxy)-estra-1,3,5(10)-triene;
17α-(4',4'-dimethyl-butatrien-1'-yl)-3,17β-bis(tetrahydropyran-2'-yloxy)-estra-1,3,5(10)-triene;
17α-(1',4',4'-trimethyl-butatrien-1'-yl)-3,17β-bis(tetrahydropyran-2'-yloxy)-estra-1,3,5(10)-triene;
17α-butatrienyl-18-methyl-3,17β-bis(tetrahydropyran-2'-yloxy)-estra-1,3,5(10)-triene;
18-methyl-17α-(1'-methyl-butatrien-1'-yl)-3,17β-bis(tetrahydropyran-2'-yloxy)-estra-1,3,5(10)-triene;
18-methyl-17α-(4'-methyl-butatrien-1'-yl)-3,17β-bis tetrahydropyran-2'-yloxy)-estra-1,3,5(10)-triene;
18-methyl-17α-(1',4'-dimethyl-butatrien-1'-yl)-3,17β-bis-(tetrahydropyran-2'-yloxy)-estra-1,3,5(10)-triene;
18-methyl-17α-(4',4'-dimethyl-butatrien-1'-yl)-3,17β-bis (tetrahydropyran-2'-yloxy)-estra-1,3,5(10)-triene;
18-methyl-17α-(1',4',4'-trimethyl-butatrien-1'-yl) 3,17β-bis(tetrahydropyran-2'-yloxy)-estra-1,3,5(10)-triene.

The above compounds are also prepared according to the above procedure using the corresponding 17α-(2',3'-dibromomethylene - prop - 1' - en - 1' - yl); 17α - (2',3'-difluoromethylene - prop - 1' - en - 1' - yl); 17α - (2',3'-bromofluoromethylene - prop - 1' - en - 1' - yl); and 17α-(bromochloromethylene - prop - 1' - en - 1' - yl) steroid starting materials respectively.

EXAMPLE 14

This example illustrates methods of preparing 3-keto compounds of Formula III using 17α-(dihalomethylene-prop-1'-en-1'-yl)-3,5-diene steroids, having 3-ether protecting groups, as starting materials. In this example 1 me. of 17α - (2',3' - dibromomethylene - prop - 1' - en-1' - yl) - 3 - ethoxy - 17β - (tetrahydropyran - 2' - yloxy)-19 - norandrosta - 3,5 - diene is dissolved in 40 ml. of anhydrous ether. The resulting solution is added dropwise, over a 10 minute period, to a mixture of 3 me. of butyl lithium in 100 ml. of anhydrous ether at —35° C., with stirring. The reaction mixture is maintained at —35° C. for an additional hour and then allowed to rise to room temperature (about 20° C.). The reaction mixture is then poured into water and extracted with methylene chloride. The extracts are washed with water, dried and evaporated to dryness, affording a 17α-butatrien-17β - (tetrahydropyran - 2' - yloxy) - 19 - norandrosta-3,5-diene residue which is then dissolved in 10 ml. of acetone in 10 ml. of acetone. A few drops of aqueous 36% (wt.) hydrochloric acid is then added to the acetone solution and the resulting mixture then heated under reflux for a few minutes. This mixture is then cooled, diluted with water and then filtered. The resulting filter cake is dried and the dried residue is further purified by recrystallization from acetone:hexane affording 17α-butatriene-17β-hydroxy-19-norandrost-4-en-3-one.

By following the same procedure, the remaining portions of the 3-ethoxy-17α-(dihalomethylene-prop-1'-en-1'-yl)-3,5-diene steroids, prepared according to Example 5 and reserved for use in the present example, are converted to the corresponding 17β-(tetrahydropyran-2'-yloxy)-17α-butatrienyl-4-en-3-one steroid compounds.

Similarly, by applying only the butyl lithium treatment and isolation steps, the following 3-desoxy-butatrienyl-17β-ethers are prepared from the corresponding 3-desoxy-17α - (dihalomethylene - prop - 1' - en - 1' - yl) - 19-norandrost (or androst)-4-en-17β-ethers:

17α-butatrienyl-17β-(tetrahydropyran-2'-yloxy)-19-norandrost-4-ene;
17α-(1'-methyl-butatrien-1'-yl)-17β-(tetrahydropyran-2'-yloxy)-19-norandrost-4-ene;
17α-(4'-methyl-butatrien-1'-yl)-17β-(tetrahydropyran-2'-yloxy)-19-norandrost-4-ene;
17α-(1',4'-dimethyl-butatrien-1'-yl)-17β-(tetrahydropyran-2'-yloxy)-19-norandrost-4-ene;
17α-(4',4'-dimethyl-butatrien-1'-yl)-17β-(tetrahydropyran-2'-yloxy)-19-norandrost-4-ene;
17α-(1',4',4'-trimethyl-butatrien-1'-yl)-17β-(tetrahydropyran-2'-yloxy)-19-norandrost-4-ene;
17α-butatrienyl-18-methyl-17β-(tetrahydropyran-2'-yloxy)-19-norandrost-4-ene;
18-methyl-17α-(1'-methyl-butatrien-1'-yl)-17β-(tetrahydropyran-2'-yloxy)-19-androst-4-ene;
18-methyl-17α-(4'-methyl-butatrien-1'-yl)-17β-(tetrahydropyran-2'-yloxy)-19-norandrost-4-ene;
18-methyl-17α-(1',4'-dimethyl-butatrien-1'-yl)-17β-tetrahydropyran-2'-yloxy)-19-norandrost-4-ene;
18-methyl-17α-(4',4'-dimethyl-butatrien-1'-yl)-17β-(tetrahydropyran-2'-yloxy)-19-norandrost-4-ene;
18-methyl-17α-(1',4',4'-trimethyl-butatrien-1'-yl)-17β-(tetrahydropyran-2'-yloxy)-19-norandrost-4-ene;
17α-butatrienyl-17β-(tetrahydropyran-2'-yloxy)-androst-4-ene;
17α-(1'-methyl-butatrien-1'-yl)-17β-(tetrahydropyran-2'-yloxy)-androst-4-ene;
17α-(4'-methyl-butatrien-1'-yl)-17β-(tetrahydropyran-2'-yloxy)-androst-4-ene;
17α-(1',4'-dimethyl-butatrien-1'-yl)-17β-(tetrahydropyran-2'-yloxy)-androst-4-ene;
17α-(4',4'-dimethyl-butatrien-1'-yl)-17β-(tetrahydropyran-2'-yloxy)-androst-4-ene;
17α-(1',4',4'-trimethyl-butatrien-1'-yl)-17β-(tetrahydropyran-2'-yloxy)-androst-4-ene;
17α-butatrienyl-18-methyl-17β-(tetrahydropyran-2'-yloxy)-androst-4-ene;
18-methyl-17α-(1'-methyl-butatrien-1'-yl)-17β-(tetrahydropyran-2'-yloxy)-androst-4-ene;
18-methyl-17α-(4'-methyl-butatrien-1'-yl)-17β-(tetrahydropyran-2'-yloxy)-androst-4-ene;
18-methyl-17α-(1',4'-dimethyl-butatrien-1'-yl)-17β-(tetrahydropyran-2'-yloxy)-androst-4-ene;
18-methyl-17α-(4',4'-dimethyl-butatrien-1'-yl)-17β-(tetrahydropyran-2'-yloxy)-androst-4-ene;
18-methyl-17α-(1',4',4'-trimethyl-butatrien-1'-yl)17β-(tetrahydropyran-2'-yloxy)-androst-4-ene.

The above 3-deoxy compounds are also similarily prepared from the corresponding 17α-(2',3'-dichloromethylene-propadienyl); 17α - (2',3' - bromochloromethylene-propadienyl) and 17α - (2',3' - difluoromethylene - propadienyl) precursors.

EXAMPLE 15

This example illustrates methods of preparing the compounds of my invention from 3-ether, 3-alkoxy, and 3-deoxy starting materials. In this example 10 mmoles of 17α - (dibromomethylene-prop - 1'-en-1'-yl)-3,17β-bis-(tetrahydropyran-2'-yloxy)-19-norandrost-4-ene is added, under a nitrogen atmosphere, to a solution of 40 mmoles of sodium methylsulfinyl carbonion in 100 ml. of dimethylsulfoxide at 10° C. The mixture is maintained at this temperature for 16 hours and then poured into water and extracted with methylene chloride. The extracts are washed with water and then evaporated to dryness affording a residue of 17α - butatrienyl-3β,17β-bis-(tetrahydropyran - 2'-yloxy)-19-norandrost-4-ene, which is further purified by chromatography over alumina eluting with hexane-benzene mixtures.

By following the above procedure using the corresponding 17α - (2',3' - dibromomethylene-prop - 1'-en-1'-yl) steroid 3-ethers as starting materials, the following compounds are respectively prepared:

3β,17β-bis(tetrahydropyran-2'-yloxy)-17α-(1'-methylbutatrien-1'-yl)-19-norandrost-4-ene;
3β,17β-bis(tetrahydropyran-2'-yloxy)-17α-(4'-methylbutatrien-1'-yl)-19-norandrost-4-ene;
3β,17β-bis(tetrahydropyran-2'-yloxy)-17α-(1',4'-dimethylbutatrien-1'-yl)-19-norandrost-4-ene;
3β,17β-bis(tetrahydropyran-2'-yloxy)-17α-(4',4'-dimethylbutatrien-1'-yl)-19-norandrost-4-ene;
3β,17β-bis(tetrahydropyran-2'-yloxy)-17α-(1',4',4'-trimethyl-butatrien-1'-yl)-19-norandrost-4-ene;
17α-butatrienyl-3β,17β-bis(tetrahydropyran-2'-yloxy)-18-methyl-19-norandrost-4-ene;
3β,17β-bis(tetrahydropyran-2'-yloxy)-18-methyl-17α-(1'-methyl-butatrien-1'-yl)-19-norandrost-4-ene
3β,17β-bis(tetrahydropyran-2'-yloxy)-18-methyl-17α-(4'-methyl-butatrien-1'-yl)-19-norandrost-4-ene;
3β,17β-bis(tetrahydropyran-2'-yloxy)-18-methyl-17α-(1',4'-dimethyl-butatrien-1'-yl)-19-norandrost-4-ene;
3β,17β-bis(tetrahydropyran-2'-yloxy)-18-methyl-17α-(4',4'-dimethyl-butatrien-1'-yl)-19-norandrost-4-ene;
3β,17β-bis(tetrahydropyran-2'-yloxy)-18-methyl-17α-(1',4',4'-trimethyl-butatrien-1'-yl)-19-norandrost-4-ene;
3β,17β-bis(tetrahydropyran-2'-yloxy)-17α-(1'-methyl-butatrien-1'-yl)-androst-4-ene;
3β,17β-bis(tetrahydropyran-2'-yloxy)-17α-(4'-methyl-butatrien-1'-yl)-androst-4-ene;
3β,17β-bis(tetrahydropyran-2'-yloxy)-17α-(1',4'-dimethyl-butatrien-1'-yl)-androst-4-ene;
3β,17β-bis(tetrahydropyran-2'-yloxy)-17α-(4',4'-dimethyl-butatrien-1'-yl)-androst-4-ene;
3β,17β-bis(tetrahydropyran-2'-yloxy)-17α-(1',4',4'-trimethyl-butatrien-1'-yl)-androst-4-ene;
17α-butatrienyl-3β,17β-bis(tetrahydropyran-2'-yloxy)-18-methyl-androst-4-ene;
3β,17β-bis(tetrahydropyran-2'-yloxy)-18-methyl-17α-(1'-methyl-butatrien-1'-yl)-androst-4-ene;
3β,17β-bis(tetrahydropyran-2'-yloxy)-18-methyl-17α-(4'-methyl-butatrien-1'-yl)-androst-4-ene;
3β,17β-bis(tetrahydropyran-2'-yloxy)-18-methyl-17α-(1',4'-dimethyl-butatrien-1'-yl)-androst-4-ene;
3β,17β-bis(tetrahydropyran-2'-yloxy)-18-methyl-17α-(4',4'-dimethyl-butatrien-1'-yl)-androst-4-ene;
3β,17β-bis(tetrahydropyran-2'-yloxy)-18-methyl-17α-(1',4',4'-trimethyl-butatrien-1'-yl)-androst-4-ene;
17α-butatrienyl-3,17β-bis(tetrahydropyran-2'-yloxy)-estra-1,3,5(10)-triene;
3,17β-bis(tetrahydropyran-2'-yloxy)-17α-(1-methyl-buta-trien-1'-yl)-estra-1,3,5(10)-triene;
3,17β-bis(tetrahydropyran-2'-yloxy)-17α-(4'-methyl-buta-trien-1'-yl)-estra-1,3,5(10)-triene;
3,17β-bis(tetrahydropyran-2'-yloxy)-17α-(1',4'-dimethyl-butatrien-1'-yl)-estra-1,3,5(10)-triene;

3,17β-bis(tetrahydropyran-2′-yloxy)-17α-(4′,4′-dimethyl-butatriene-1l-yl)-estra-1,3,5(10)-triene;
3,17β-bis(tetrahydropyran-2′-yloxy)-17α-(1′,4′,4′-trimethyl-butatrien-1′-yl)-estra-1,3,5(10)-triene;
17α-butatrienyl-3,17β-bis(tetrahydropyran-2′-yloxy)-18-methyl-estra-1,3,5(10)-triene;
3,17β-bis(tetrahydropyran-2′-yloxy)-18-methyl-17α-(1′-methyl-butatrien-1′-yl)-estra-1,3,5(10)-triene;
3,17β-bis(tetrahydropyran-2′-yloxy)-18-methyl-17α-(4′-methyl-butatrien-1′-yl)-estra-1,3,5(10)-triene;
3,17β-bis(tetrahydropyran-2′-yloxy)-18-methyl-17α-(1′,4′-dimethyl-butatrien-1′-yl)-estra-1,3,5(10)-triene;
3,17β-bis(tetrahydropyran-2′-yloxy)-18-methyl-17α-(4′,4′-dimethyl-butatrien-1′-yl)-estra-1,3,5(10)-triene;
3,17β-bis(tetrahydropyran-2′-yloxy)-18-methyl-17α-(1′,4′,4′-trimethyl-butatrien-1′-yl)-estra-1,3,5(10)-triene;
17α-butatrienyl-17β-(tetrahydropyran-2′-yloxy)-3-methoxy-estra-1,3,5(10)-triene;
17β-(tetrahydropyran-2′-yloxy)-3-methoxy-17α-(1′-methyl-butatrien-1′-yl)-estra-1,3,5(10)-triene;
17β-(tetrahydropyran-2′-yloxy)-3-methoxy-17α-(4′-methyl-butatrien-1′-yl)-estra-1,3,5(10)-triene;
17β-(tetrahydropyran-2′-yloxy)-3-methoxy-17α-(1′,4′-dimethyl-butatrien-1′-yl)-estra-1,3,5(10)-triene;
17β-(tetrahydropyran-2′-yloxy)-3-methoxy-17α-(4′,4′-dimethyl-butatrien-1′-yl)-estra-1,3,5(10)-triene;
17β-(tetrahydropyran-2′-yloxy)-3-methoxy-17α-(1′,4′,4′-trimethyl-butatrien-1′-yl)-estra-1,3,5(10)-triene;
17α-butatrienyl-17β-(tetrahydropyran-2′-yloxy)-3-methoxy-18-methyl-estra-1,3,5(10)-triene;
17β-(tetrahydropyran-2′-yloxy)-3-methoxy-17α-(1′-methyl-butatrien-1′-yl)-18-methyl-estra-1,3,5(10)-triene;
17β(tetrahydropyran-2′-yloxy)-3-methoxy-17α-(4′-methyl-butatrien-1′-yl)-18-methyl-estra-1,3,5(10)-triene;
17β-(tetrahydropyran-2′-yloxy)-3-methoxy-17α-(1′,4′-dimethyl-butatrien-1′-yl)-18-methyl-estra-1,3,5(10)-triene;
17β(tetrahydropyran-2′-yloxy)-3-methoxy-17α-(4′,4′-dimethyl-butatrien-1′-yl)-18-methyl-estra-1,3,5(10)-triene;
17β-(tetrahydropyran-2′-yloxy)-3-methoxy-17α-(1′,4′,4′-trimethyl-butatrien-1′-yl)-18-methyl-estra-1,3,5(10)-triene.

The 3 - deoxy - 17β - (tetrahydropyran - 2′ - yloxy)-17α - butatrienyl products enumerated in Example 14 are also, respectively, prepared according to the procedure of this example, from each of the corresponding 3-deoxy-17β - (tetrahydropyran - 2′ - yloxy) - 17α - (2′,3′ - dihalomethylene-propadienyl) starting materials applied according to Example 14.

EXAMPLE 16

This example illustrates methods of converting 17α-butatrienyl steroid 3,17β-ethers to the corresponding 3,17β-diols. In this example 5 mmoles of 17α-butatrienyl-3,17β - bis(tetrahydropyran - 2′ - yloxy) - 19 - norandrost-4-ene is added to 50 ml. of an anhydrous methanol solution containing 1% (wt.) oxalic acid at room temperature (20° C.). The mixture is allowed to stand for one hour and is then neutralized by the addition of dilute aqueous sodium bicarbonate solution. The neutralized mixture is poured into water and then filtered. The filter cake is washed with water and then dried affording crude 17α-butatrienyl - 3,17β - dihydroxy - 19 - norandrost - 4 - ene which is further purified by chromatography over alumina eluting with hexane.

By following the above procedure, the 3,17β-bis(tetrahydropyran-2′-yloxy) products of Example 15 are converted to the corresponding 17α-butatrienyl-3,17β-diol steroids.

EXAMPLE 17

This example illustrates methods of converting 17α-butatrienyl steroids having a 3-hydroxy group to the corresponding 3-keto steroids. In this example 10 g. of freshly precipitated manganese dioxide are admixed to a solution of 1 g. of 17α-butatrienyl-3,17β-dihydroxy-19-norandrost-4-ene in 100 ml. of chloroform. The mixture is stirred at room temperature for 18 hours and then filtered. The filter cake is washed with hot chloroform and the washings combined with the filtrate and evaporated. The resulting 17α - butatrienyl - 17β - hydroxy-19-norandrost-4-en-3-one residue is further purified by recrystallization from acetone-hexane.

By following the above procedure, the products of Example 16 are converted to the corresponding 3-keto compounds.

Obviously many modifications and variations of the invention described hereinabove and in the claims can be made without departing from the essence of the scope thereof.

What is claimed is:
1. A compound selected from the group having the formulas:

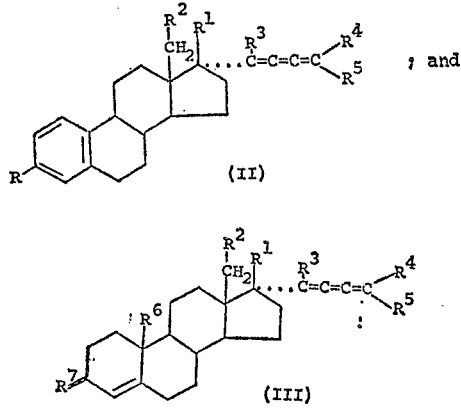

wherein R is selected from the group consisting of hydroxy, lower alkoxy groups having less than 12 carbon atoms, acid labile ether groups having less than 12 carbon atoms, and carboxylic acyloxy groups having less than 12 carbon atoms; $R^1$ is selected from the group consisting of hydroxy, acid labile ether groups having less than 12 carbon atoms, and carboxylic acyloxy groups having less than 12 carbon atoms; $R^2$, $R^3$, $R^4$ and $R^5$ are independently selected from the group consisting of H and lower alkyl; $R^6$ is selected from the group consisting of H and methyl; and $R^7$ is selected from the group consisting of oxo and the group

wherein $R^8$ is selected from the group consisting of H, hydroxy, lower alkoxy groups having less than 12 carbon atoms, acid labile ether groups having less than 12 carbon atoms, and acyloxy groups having less than 12 carbon atoms.

2. The compound of Formula II of claim 1 wherein R is selected from the group consisting of hydroxy, methoxy, and acetoxy; $R^1$ is selected from the group consisting of hydroxy and acetoxy; and $R^3$, $R^4$, and $R^5$ are independently selected from the group consisting of H and methyl.

3. The compound of claim 2 wherein said compound is selected from the group consisting of:

3-acetoxy - 17β - hydroxy - 17α - (4′,4′ - dimethyl-butatrienyl)-estra-1,3,5(10)-triene;
3,17β - diacetoxy - 17α - (4′,4′ - dimethyl-butatrienyl)-estra-1,3,5(10)-triene;
3,17β - dihydroxy - 17α - (1′ - methyl-butatrienyl)-estra-1,3,5(10)-triene;

17β - acetoxy - 3 - hydroxy - 17α - (1' - methyl-butatrienyl)-estra-1,3,5(10)-triene;

17β - acetoxy - 17α - butatrienyl - 3 - hydroxy-estra-1,3,5(10)-triene;

17β - acetoxy - 17α - butatrienyl - 3 - methoxy-estra-1,3,5(10)-triene;

3,17β - diacetoxy - 17α - butatrien-estra - 1,3,5(10)-triene;

17α - butatrienyl - 3,17β - dihydroxy-estra-1,3,5(10)-triene;

17α - butatrienyl - 17β - hydroxy - 3 - methoxy-estra-1,3,5(10)-triene; and

3 - acetoxy - 17α - butatrienyl - 17β - hydroxy-estra-1,3,5(10)-triene.

4. The compound of Formula III of claim 1 wherein R¹ is selected from the group consisting of hydroxy and acetoxy; R² is selected from the group consisting of H and methyl; R³, R⁴, and R⁵ are independently selected from the group consisting of H and methyl; and R⁷ is selected from the group consisting of oxo and the group

wherein R⁸ is selected from the group consisting of H, hydroxy, and acetoxy.

5. The compound of claim 4 wherein said compound is selected from the group consisting of:

17α-butatrienyl-3β,17β-dihydroxy-19-norandrost-4-ene;
17α-butatrienyl-3β,17β-dihydroxy-18-methyl-19-norandrost-4-ene;
17β-acetoxy-17α-butatrienyl-3β-hydroxy-19-norandrost-4-ene;
17β-acetoxy-17α-butatrienyl-3β-hydroxy-18-methyl-19-norandrost-4-ene;
3β-acetoxy-17α-butatrienyl-17β-hydroxy-19-norandrost-4-ene;
3β-acetoxy-17α-butatrienyl-17β-hydroxy-18-methyl-19-norandrost-4-ene;
3β,17β-diacetoxy-17α-butatrienyl-19-norandrost-4-ene;
3β,17β-diacetoxy-17α-butatrienyl-18-methyl-19-norandrost-4-ene;
17α-butatrienyl-17β-hydroxy-19-norandrost-4-en-3-one;
17α-butatrienyl-17β-hydroxy-18-methyl-19-norandrost-4-ene-3-one;
17β-acetoxy-17α-butatrienyl-19-norandrost-4-en-3-one;
17β-acetoxy-17α-butatrienyl-18-methyl-19-norandrost-4-en-3-one;
17α-butatrientyl-17β-hydroxy-androst-4-ene;
17α-butatrienyl-17β-hydroxy-18-methyl-androst-4-ene;
17β-acetoxy-17α-butatrienyl-androst-4-ene;
17β-acetoxy-17α-butatrienyl-18-methyl-androst-4-ene;
17β-hydroxy-17α-(4',4'-dimethyl-butatrienyl)-19-norandrost-4-en-3-one;
17β-hydroxy-17α-(4',4'-dimethyl-butatrienyl)-18-methyl-19-norandrost-4-en-3-one;
17β-acetoxy-17α-(4',4'-dimethyl-butatrienyl)-19-norandrost-4-en-3-one;
17β-acetoxy-17α-(4',4'-dimethyl-butatrienyl)-18-methyl-19-norandrost-4-en-3-one;
17β-hydroxy-17α-(1'-methyl-butatrienyl)-19-norandrost-4-en-3-one;
17β-hydroxy-17α-(1'-methyl-butatrienyl)-18-methyl-19-norandrost-4-en-3-one;
17β-acetoxy-17α-(1'-methyl-butatrienyl)-19-norandrost-4-en-3-one;
17β-acetoxy-17α-(1'-methyl-butatrienyl)-18-methyl-19-norandrost-4-en-3-one;
17β-hydroxy-17α-(1',4',4'-trimethyl-butatrienyl)-19-norandrost-4-en-3-one;
17β-hydroxy-17α-(1',4',4'-trimethyl-butatrienyl)-18-methyl-19-norandrost-4-en-3-one;
17β-acetoxy-17α-(1',4',4'-trimethyl-butatrienyl)-19-norandrost-4-en-3-one; and
17β-acetoxy-17α-(1',4',4'-trimethyl-butatrien-18-methyl-19-norandrost-4-en-3-one.

6. The compound of claim 5 wherein said compound is selected from the group consisting of:

17α-butatrienyl-17β-hydroxy-19-norandrost-4-en-3-one;
17α-butatrienyl-17β-hydroxy-18-methyl-19-norandrost-4-en-3-one;
17β-hydroxy-17α-(1'-methyl-butatrienyl)-19-norandrost-4-en-3-one; and
17β-hydroxy-17α-(1'-methyl-butatrienyl)-18-methyl-19-norandrost-4-en-3-one.

References Cited
UNITED STATES PATENTS
3,392,165  7/1968  Edwards et al. ____ 260—239.55
3,392,166  7/1968  Edwards et al. ____ 260—239.55

HENRY A. FRENCH, Primary Examiner

U.S. Cl. X.R.
260—239.55 R, 397.5, 999